United States Patent
Takamizawa et al.

(10) Patent No.: US 11,733,039 B2
(45) Date of Patent: Aug. 22, 2023

(54) INFORMATION PROCESSING APPARATUS

(71) Applicant: MAXELL, LTD., Kyoto (JP)

(72) Inventors: Naohisa Takamizawa, Kyoto (JP); Sadao Tsuruga, Kyoto (JP); Yasunobu Hashimoto, Kyoto (JP); Yoshinori Okada, Kyoto (JP)

(73) Assignee: MAXELL, LTD., Kyoto (JP)

( * ) Notice: Subject to any disclaimer, the term of this patent is extended or adjusted under 35 U.S.C. 154(b) by 0 days.

(21) Appl. No.: 17/282,197

(22) PCT Filed: Oct. 2, 2018

(86) PCT No.: PCT/JP2018/036870
§ 371 (c)(1),
(2) Date: Apr. 1, 2021

(87) PCT Pub. No.: WO2020/070801
PCT Pub. Date: Apr. 9, 2020

(65) Prior Publication Data
US 2021/0344838 A1 Nov. 4, 2021

(51) Int. Cl.
*G01C 9/06* (2006.01)
*H04N 23/698* (2023.01)
(Continued)

(52) U.S. Cl.
CPC ............... *G01C 9/06* (2013.01); *H04N 23/63* (2023.01); *H04N 23/69* (2023.01);
(Continued)

(58) Field of Classification Search
CPC .................. G01C 9/06; G06T 2200/32; G06T 2207/20221; G06V 10/40; G11B 27/00;
(Continued)

(56) References Cited

U.S. PATENT DOCUMENTS

| 7,206,017 B1 | 4/2007 | Suzuki |
| 2006/0156254 A1 | 7/2006 | Satake |

(Continued)

FOREIGN PATENT DOCUMENTS

| JP | 2000-152168 A | 5/2000 |
| JP | 2003-284019 A | 10/2003 |

(Continued)

OTHER PUBLICATIONS

International Search Report issued in corresponding International Patent Application No. PCT/JP2018/036870, dated Nov. 27, 2018, with English translation.

*Primary Examiner* — Farzana Hossain
(74) *Attorney, Agent, or Firm* — McDermott Will & Emery LLP

(57) ABSTRACT

When thumbnails of a wide-angle panorama image are displayed, by scrolling and displaying a thumbnail image in which distortion and tilt deviation are reduced, visibility is improved. An information processing apparatus includes an image correction information generating unit, a control unit, and a display unit. The image correction information generating unit is composed of an image distortion determination processing unit and a horizontal/vertical direction determination processing unit, and generate correction information for correcting a partial image composed of an arbitrary image area of the wide-angle panorama image. The control unit corrects the partial image on a basis of the correction information generated by the image correction information generating unit. The display unit 108 displays an image. Then, the control unit causes the display unit to display the corrected partial image as the thumbnail image.

14 Claims, 14 Drawing Sheets

(51) Int. Cl.
*H04N 23/63* (2023.01)
*H04N 23/69* (2023.01)
*H04N 23/80* (2023.01)

(52) U.S. Cl.
CPC .......... *H04N 23/698* (2023.01); *H04N 23/80* (2023.01); *G06T 2200/32* (2013.01); *G06T 2207/20221* (2013.01)

(58) Field of Classification Search
CPC .............. H04N 5/217; H04N 5/23229; H04N 5/23238; H04N 5/23293; H04N 5/23296; H04N 5/2628; H04N 5/91; H04N 23/63; H04N 23/69; H04N 23/698; H04N 23/80; H04N 23/81
See application file for complete search history.

(56) References Cited

U.S. PATENT DOCUMENTS

| | | |
|---|---|---|
| 2011/0234852 A1 | 9/2011 | Ishida |
| 2015/0070463 A1 | 3/2015 | Nakajima |
| 2017/0177926 A1 | 6/2017 | Takayama |
| 2020/0014843 A1* | 1/2020 | Ogawa ................ G06F 3/04883 |

FOREIGN PATENT DOCUMENTS

| | | |
|---|---|---|
| JP | 2006-186647 A | 7/2006 |
| JP | 2011-211267 A | 10/2011 |
| JP | 2012-099906 A | 5/2012 |
| JP | 2015-053573 A | 3/2015 |
| JP | 2017-118472 A | 6/2017 |
| JP | 2017-147682 A | 8/2017 |

* cited by examiner

INFORMATION PROCESSING APPARATUS

CROSS REFERENCE TO RELATED APPLICATIONS

This application is the U.S. National Phase under 35 U.S.C. § 371 of International Application No. PCT/JP2018/036870, filed on Oct. 2, 2018, the entire contents are hereby incorporated by reference.

TECHNICAL FIELD

The present invention relates to an information processing apparatus, and more specifically, the present invention relates to a technique effective for thumbnail display of a wide-angle panorama image.

BACKGROUND ART

When a plurality of images photographed by a portable information terminal equipped with a camera, such as a digital camera or a smartphone, is visually recognized or searched, for example, it is widely used to create thumbnails of the plurality of images by using an information processing apparatus or the like and display a list thereof.

As list display of thumbnails by an information processing apparatus, there is one in which total 9 thumbnails of 3 columns×3 rows are arranged on a display screen, for example. In this case, as one display area, a rectangular thumbnail having an aspect ratio of 3:4 or an aspect ratio of 9:16 corresponding an angle of view of a camera is generally assumed.

However, when a thumbnail is displayed even for a wide-angle panorama image having a greatly different aspect ratio, the thumbnail is to be displayed in an area with the aspect ratio of 3:4 or the aspect ratio of 9:16. In that case, there has been a problem that it was difficult to visually recognize an image because the thumbnail with a high reduction ration was displayed.

As a technique to improve the visibility of this type of thumbnail image, there is a technique in which a thumbnail of a 3D image is generated in a case where an image is a panoramic image, and a 3D thumbnail for the image is displayed while rotating it (for example, see Patent document 1).

As another technique, there are a technique in which in a case where selected image data to be displayed are panoramic display, such a panoramic image is scrolled and displayed in a display area (for example, see Patent document 2) and a technique in which a cut-out image obtained by correcting distortion of a thumbnail is displayed together with the thumbnail (for example, see Patent document 3).

RELATED ART DOCUMENTS

Patent Documents

Patent document 1:Japanese Patent Application Publication No. 2012-99906
Patent document 2:Japanese Patent Application Publication No. 2000-152168
Patent document 3:Japanese Patent Application Publication No. 2017-118472

SUMMARY OF THE INVENTION

Problems to be Solved by the Invention

In the techniques described in Patent document 1 and Patent document 2 described above, there is description that a thumbnail is displayed while rotating or scrolling a panoramic image. However, they do not consider image distortion that occurs in a peripheral portion of the wide-angle panorama image photographed at a wide angle.

Therefore, the panoramic image photographed at the wide angle and having distortion is displayed as it is while rotating or scrolling it. This makes it difficult to view what is photographed, and there has been a problem that it become difficult to discriminate the image.

Further, in the technique described in Patent document 3, a thumbnail for a specific photographic subject whose distortion was corrected is merely displayed. There has been a problem that it is difficult to visually recognize the whole wide-angle image in every corner thereof clearly.

It is an object of the present invention to provide a technique capable of improving visibility of a wide-angle panorama image when a thumbnail of the wide-angle panorama image is to be displayed, by scrolling and displaying a thumbnail image obtained by reducing distortion and tilt deviation.

The foregoing and other objects, features and advantages of the present invention will become more readily apparent from the following detailed description of embodiments of the present invention that proceeds with reference to the appending drawings.

Means for Solving the Problem

An outline of representative invention of the present invention disclosed in the present application will briefly be explained as follows.

Namely, a representative information processing apparatus includes an image correction information generating unit, a control unit, and a display unit. The image correction information generating unit is configured to generate correction information for correcting a partial image, the partial image being composed of an arbitrary image area of a wide-angle panorama image. The control unit is configured to correct the partial image on a basis of the correction information generated by the image correction information generating unit. The display unit is configured to display an image.

Then, the control unit further configured to cause the display unit to scroll and display the corrected partial image as a thumbnail image.

In particular, the image correction information generating unit includes a horizontal/vertical direction determination processing unit and an image distortion determination processing unit. The horizontal/vertical direction determination processing unit is configured to generate horizontal/vertical direction information for correcting deviation of each of a horizontal direction and a vertical direction of the partial image composed of the arbitrary image area of the wide-angle panorama image on a basis of first sensor information. The first sensor information indicates a tilt of each of a horizontal and a vertical direction of the wide-angle panorama image. The horizontal/vertical direction determination processing unit is also configured to output the generated horizontal/vertical direction information to the control unit as the correction information.

The image distortion determination processing unit is configured to generate image distortion information for correcting image distortion of the partial image on a basis of second sensor information. The second sensor information indicates a state of photographing distortion caused by a lens for photographing. The image distortion determination processing unit is also configured to output the generated image distortion information to the control unit as the correction information.

The control unit is configured to correct the deviation of each of the horizontal direction and the vertical direction of the partial image and the image distortion in accordance with the horizontal/vertical direction information generated by the horizontal/vertical direction determination processing unit and the image distortion information generated by the image distortion determination processing unit.

Each of the image correction information generating unit, the horizontal/vertical direction determination processing unit, and the image distortion determination processing unit is stored in a memory unit as a program, and executes a process by the control unit. In a case where dedicated hardware for executing an image correction information generating process, a horizontal/vertical direction determining process, and an image distortion determining process is implemented, each of the processes may be executed by the dedicated hardware.

Effects of the Invention

Effects obtained by the representative invention of the present invention disclosed in the present application will briefly be explained as follows.

It is possible to improve visibility of a wide-angle panorama image in thumbnail display.

BRIEF DESCRIPTIONS OF THE DRAWINGS

DETAILED DESCRIPTION OF EMBODIMENTS

Figure 1:
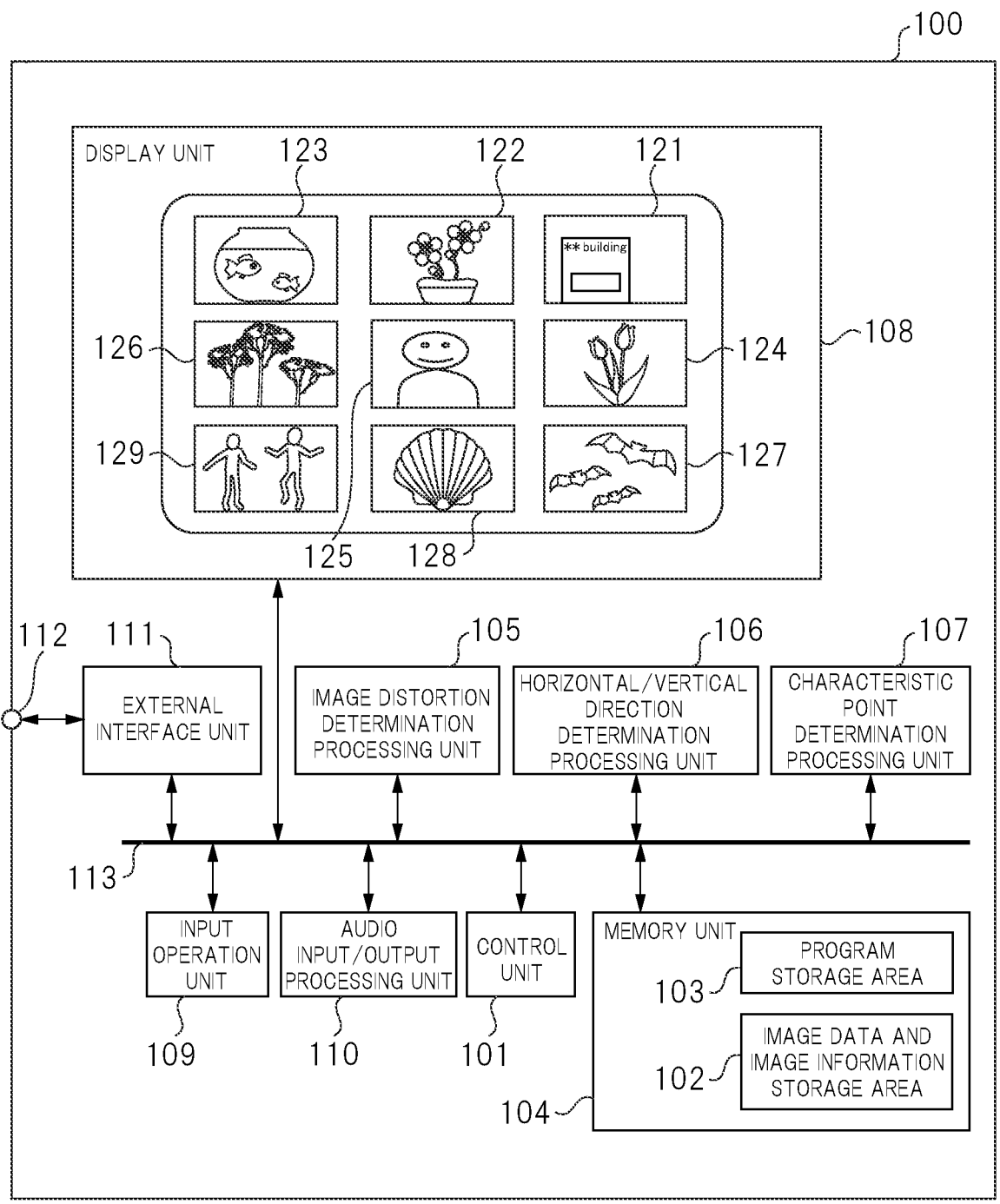
FIG. 1 is an explanatory drawing illustrating one example of a configuration of an information processing apparatus according to a first embodiment.

In all drawings for explaining embodiments, the same reference numerals are respectively in principle applied to the same members, and repeated explanation thereof will be omitted.

First Embodiment

Hereinafter, a first embodiment will be described in detail.
<Configuration Example of Information Processing Apparatus>

FIG. 1 is an explanatory drawing illustrating one example of a configuration of an information processing apparatus 100 according to the present embodiment.

As illustrated in FIG. 1, the information processing apparatus 100 is configured from a control unit (controller) 101, a memory unit 104, an image distortion determination processing unit (image distortion determination processing program) 105, a horizontal/vertical direction determination processing unit (horizontal/vertical direction determination processing program) 106, a characteristic point determination processing unit 107, a display unit (display) 108, an input operation unit (input operation interface) 109, an audio input/output processing unit (audio input/output interface) 110, an external interface unit (external interface) 111, an external input/output terminal (input/output interface) 112, and the like.

The control unit 101, the memory unit (memory) 104, the image distortion determination processing unit 105, the horizontal/vertical direction determination processing unit 106, the characteristic point determination processing unit 107, the display unit 108, the input operation unit 109, the audio input/output processing unit 110, and the external interface unit 111 are connected to each other via a bus 113.

The memory unit 104 includes storage areas such as an image data and image information storage area 102 or a program storage area 103 in which a program for controlling operations is stored. The image data and image information storage area 102 is an area for storing information such as original image data, first sensor information (will be described later), or second sensor information (will be described later). The program storage area 103 is an area for storing programs for controlling operations such as a program for controlling an operation of the information processing apparatus 100.

An external device such as a digital camera or a portable information terminal equipped with a camera is connected to the external input/output terminal 112, for example. An image photographed by the digital camera or the portable information terminal equipped with the camera is inputted to the external interface unit 111 via the external input/output terminal 112. The inputted image is stored in the image data and image information storage area 102 of the memory unit 104 as an original image.

Here, the image photographed by the digital camera or the portable information terminal equipped with the camera is a standard image with an aspect ratio of 3:4 or an aspect ratio of 9:16, which corresponds to an angle of view of a camera, for example, or a wide-angle panorama image photographed at a wide angle.

The horizontal/vertical direction determination processing unit 106 that is an image correction information generating unit (including an image correction information generating program) determines at least any direction of a horizontal direction or a vertical direction of each partial image, which is an image of an arbitrary area of the original image read out from the memory unit 104 with respect to the wide-angle panorama image stored in the memory unit 104 as the original image, and generates horizontal/vertical direction information.

Alternatively, the horizontal/vertical direction determination processing unit 106 may determine the horizontal direction or the vertical direction by recognizing, as a pattern, at least any direction of the horizontal direction or the vertical direction from a photographic subject or the like captured in the original image.

Further, in a case where first sensor information indicating a photographing state of the horizontal direction or the vertical direction is contained in data on the original image inputted to the information processing apparatus 100, the horizontal direction or the vertical direction may be determined using the first sensor information. In this case, the first sensor information is stored in the image data and image information storage area 102 of the memory unit 104.

The image distortion determination processing unit 105 that is an image correction information generating unit determines image distortion in each partial image of the original image of the wide-angle panorama image read out from the memory unit 104, and generates image distortion information. In this case, the control unit 101 may determine the image distortion by recognizing patterns such as a photographic subject captured in the original image.

Further, in a case where second sensor information indicating a photographing distortion state that occurs by a camera lens or the like is contained in data of the original image photographed by photographing equipment such as the digital camera or the portable information terminal equipped with the camera, the image distortion determination processing unit 105 may determine the image distortion using the second sensor information.

In this case, the second sensor information is stored in the image data and image information storage area 102 of the memory unit 104. This second sensor information may be static distortion information of an optical system containing the camera lens, information containing a so-called lens profile, or the like.

The control unit 101 is composed of a CPU (Central Processing Unit) and the like, for example. The control unit 101 executes programs such as an OS (Operating System) or a program for controlling operations stored in the memory unit 104, thereby controlling each functional block to execute an operation controlling process of the whole information processing apparatus 100.

This control unit 101 corrects deviation of the horizontal direction or the vertical direction of the original image in accordance with the horizontal/vertical direction information generated by the horizontal/vertical direction determination processing unit 106, and corrects image distortion of the original image in accordance with the image distortion information generated by the image distortion determination processing unit 105.

Then, the control unit 101 controls the display unit 108 to scroll and display an image in which tilt deviation of the horizontal direction or the vertical direction and the image distortion are corrected. In this case, the image is scrolled and displayed so that display thereof moves in the horizontal direction of the image at an angle of view of a standard image.

The memory unit 104 is composed of a nonvolatile memory exemplified as a flash memory. As described above, various kinds of programs and the image data such as the original image used by the control unit 101, and image information that is information accompanying the image data, such as the first sensor information or the second sensor information are stored in the memory unit 104.

The display unit 108 is composed of a liquid crystal panel or the like, and displays notification information indicating an alert to a user, a display state, or the display content in addition to the image. Further, as illustrated in FIG. 1, the display unit 108 displays thumbnails 121 to 129 and the like.

In FIG. 1, the thumbnail 121 is a thumbnail of a wide-angle panorama image, and the thumbnails 122 to 129 are thumbnails of a standard image. The wide-angle panorama image is generally a horizontally long or vertically long image that is wider than the standard image. The wide-angle panorama image is an image that requires processing such as reduction or trimming in order to be displayed at the aspect ratio of the standard image.

The input operation unit 109 is an input unit for inputting various kinds of information, and is composed of a keyboard and a mouse, for example. The input operation unit 109 allows the user to set and input information that the user wants to input. Further, the input operation unit 109 may be configured so as to be provided in the display unit 108.

In that case, the display unit 108 has a touch pad function such as a capacitance type, for example. A touch pad is displayed on the display unit 108 to detect approach or a contact operation by a finger or a stylus pen, whereby information is inputted.

The audio input/output processing unit 110 processes voice to be inputted or outputted. This audio input/output processing unit 110 includes a microphone for inputting external voice and a speaker for outputting voice to the outside, and notifies various kinds of messages and the like by voice.

The characteristic point determination processing unit 107 determines and extracts a partial image of a characteristic point of the photographic subject set and inputted by the input operation unit 109, for example, a face as the characteristic point, and generates characteristic point possessing partial image information indicating an image portion in which the characteristic point is photographed.

Then, the control unit 101 controls the display unit 108 to scroll and display thumbnails in accordance with the characteristic point possessing partial image information generated by the characteristic point determination processing unit 107 while emphasizing the partial image having the characteristic point.

By the configuration described above, when thumbnails of a wide-angle panorama image are displayed, it is possible to scroll and display the wide-angle panorama image while moving the wide-angle panorama image in the horizontal direction at the angle of view of the standard image by using the image in which tilt deviation of the horizontal direction or the vertical direction and image distortion are corrected in each partial image of the original image.

As a result, when the thumbnails are displayed, it is possible to scroll and display the image of a state where tilt and distortion of a photographic subject captured in the wide-angle panorama image, which is the original image, are corrected in every corner thereof. As a result, the user can easily and accurately recognize the thumbnail display, and this makes it possible to improve visibility greatly.

In addition, it is possible to emphasize, scroll, and display the image whose tilt and distortion are corrected by focusing on a characteristic point such as a face captured in the wide-angle panorama image that is the original image. Therefore, the user can visually recognize a portion that the user wants to view easily by the image whose tilt and distortion are corrected.

<Processing Example of Thumbnail Image>

Subsequently, an operation of the information processing apparatus 100 will be described.

Figure 2:
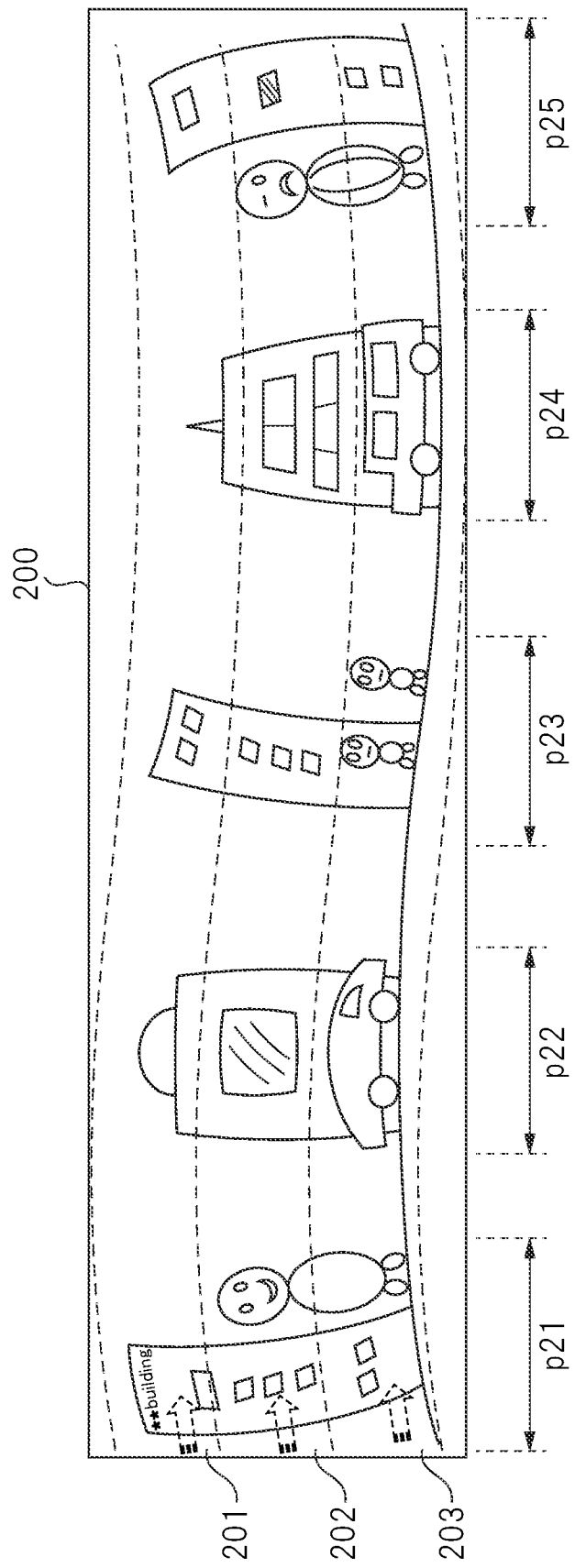
FIG. 2 is an explanatory drawing illustrating one example of a scrolling display process for a wide-angle panorama image by the information processing apparatus illustrated in FIG. 1.

FIG. 2 is an explanatory drawing illustrating one example of a scrolling display process in a wide-angle panorama image 200 by the information processing apparatus 100 illustrated in FIG. 1.

An example in which the wide-angle panorama image 200, which is an original image illustrated in FIG. 2, has tilt deviation of a horizontal direction or a vertical direction and partial image distortion by a tilt at the time of photographing of a camera or a distorted state of a camera lens for photographing is illustrated.

When thumbnails of the wide-angle panorama image 200 are displayed, scrolling display is executed along three scroll loci 201 to 203 from an upper portion to a lower portion of FIG. 2. Further, positions p21 to p25 illustrated in FIG. 2 respectively indicate points of a partial image for scrolling and displaying the wide-angle panorama image 200 in each of the scroll loci 201 to 203.

In a case where the thumbnails of the wide-angle panorama image 200 are displayed, as illustrated by the scroll locus 201, the control unit 101 first displays a partial image in which tilt deviation of the image and image distortion are corrected in accordance with image distortion information while scrolling in a right direction along the horizontal direction of the wide-angle panorama image 200 on the basis of horizontal/vertical direction information from an upper-most stage of a left side of the wide-angle panorama image 200. Here, the partial image to be displayed has a standard angle of view.

As described above, the horizontal/vertical direction information is information generated by the horizontal/vertical direction determination processing unit 106, and the image distortion information is information generated by the image distortion determination processing unit 105.

After the scroll locus 201 is scrolled and displayed to a right end of the wide-angle panorama image 200, in the similar manner to the scroll locus 201, the control unit 101 displays a partial image after correction while scrolling in a right horizontal direction of the wide-angle panorama image 200 from a left side of the scroll locus 202.

When the scrolling display of the scroll locus 202 is terminated, in the similar manner to the scroll loci 201 and 202, the control unit 101 displays a corrected partial image while scrolling in the right horizontal direction of the wide-angle panorama image 200 from a left side of the scroll locus 203 in the wide-angle panorama image 200.

As described above, the whole screen of the wide-angle panorama image 200 is scrolled and displayed by the partial images with the standard angle of view in which tilt deviation and distortion in the image are corrected.

<Display Example of Thumbnail>

Figure 3:
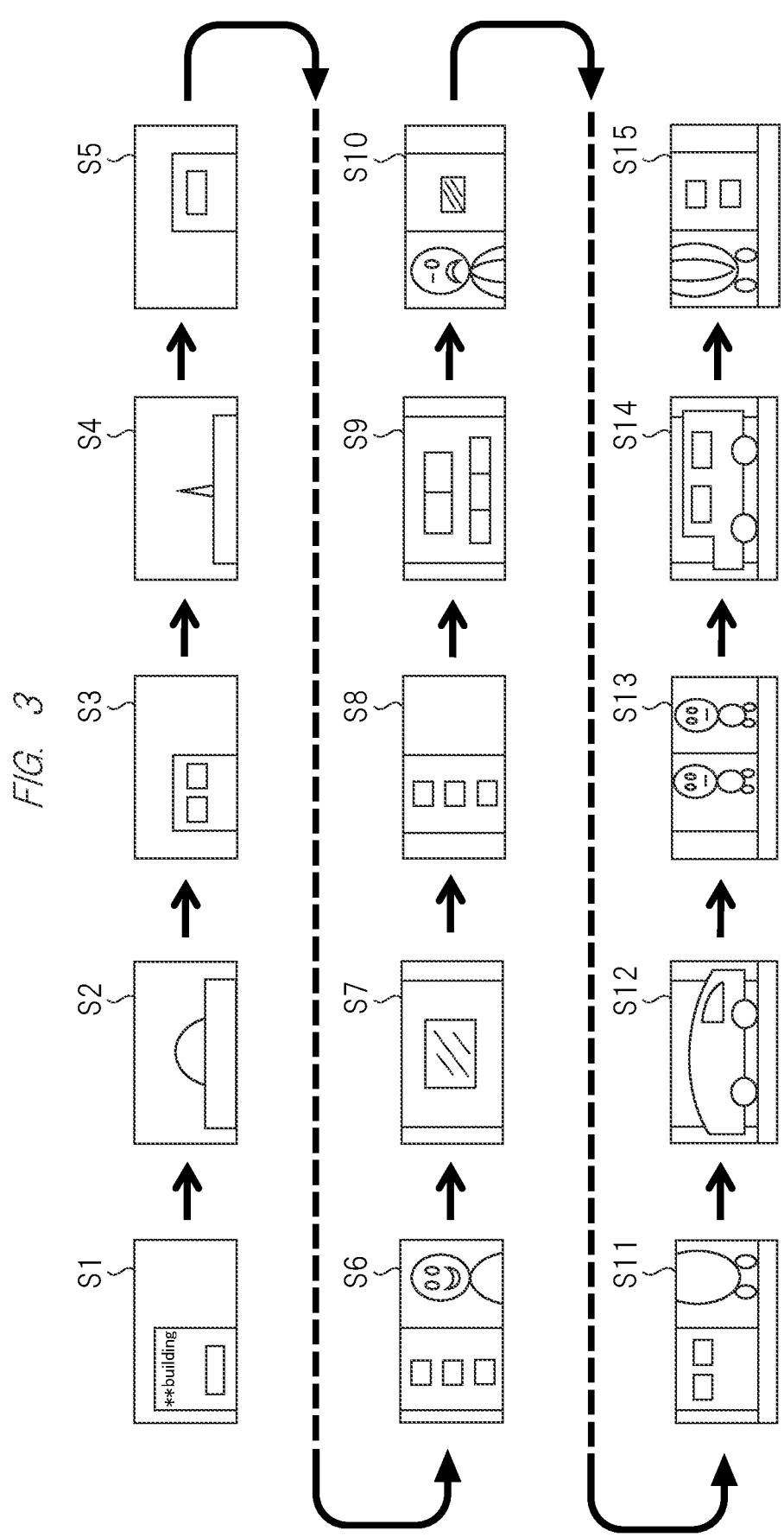
FIG. 3 is an explanatory drawing illustrating a display example of respective partial images of the wide-angle panorama image that is scrolled and displayed as thumbnail display of the wide-angle panorama image illustrated in FIG. 2.

FIG. 3 is an explanatory drawing illustrating a display example of respective partial images of the wide-angle panorama image scrolled and displayed as thumbnail display of the wide-angle panorama image 200 illustrated in FIG. 2.

FIG. 3 schematically illustrates partial images that are in turn scrolled and displayed in the respective positions p21 to p25 of the wide-angle panorama image 200 illustrated in FIG. 2.

Images S1 to S5 illustrated in FIG. 3 are partial images after correction that are displayed while scrolling the scroll locus 201 illustrated in FIG. 2. These images S1 to S5 are partial images in the respective positions p21, p22, p23, p24, and p25 of the scroll locus 201 illustrated in FIG. 2.

Images S6 to S10 illustrated in FIG. 3 are partial images after correction that are displayed while scrolling the scroll locus 202 illustrated in FIG. 2. These images S6 to S10 are partial images in respective positions p21, p22, p23, p24, and p25 of the scroll locus 202 illustrated in FIG. 2.

Images S11 to S15 illustrated in FIG. 3 are partial images after correction that are displayed while scrolling the scroll locus 203 illustrated in FIG. 2. These images S11 to S15 are partial images in the respective positions p21, p22, p23, p24, and p25 of the scroll locus 203 illustrated in FIG. 2.

Thus, by continuously displaying the images S1 to S15, which are partial images with the standard angle of view in which tilt deviation of the horizontal direction or the vertical direction and partial image distortion are corrected, it is possible to display the wide-angle panorama image 200 as if it were a moving image that scrolls in the horizontal direction.

This makes it possible to visually recognize the whole wide-angle panorama image 200, which is an original image, in every corner thereof accurately.

In the example described above, a case where the whole wide-angle panorama image 200, which is the original image, is divided into three in the vertical direction and each of the scroll loci 201 to 203 is scrolled and displayed in the horizontal direction from the right side thereof has been described. However, the number of divisions of the scroll locus may be one or a plural number other than three depending upon a size of the original image. Further, a scrolling direction may be the direction opposite to that illustrated in FIG. 2, that is, a direction from the right side to the left side of the wide-angle panorama image 200.

Moreover, the scrolling display of the wide-angle panorama image 200 by the control unit 101 may be displayed so as to gradually shift in the vertical direction of the wide-angle panorama image 200 while scrolling in the horizontal direction of the wide-angle panorama image 200.

This makes it possible to visually recognize the whole image in the wide-angle panorama image 200 roughly and quickly.

Note that in the example illustrated in FIG. 3, an example in which a non-photographic object such as a building or a background is included in the partial image has been described. However, such a non-photographic object may not be displayed as the partial image.

For example, in a case where an upper side of the wide-angle panorama image 200 is only the sky and clouds, the scrolling display may be started from a portion in which a photographic subject other than the sky and the clouds is captured. Further, in a case where a lower side of the wide-angle panorama image 200 is similarly only the ground, the scrolling display may be terminated before the ground, or the scrolling display of the upper side may be repeated. Namely, the scrolling display may be executed in a form of exclusion of the non-photographic object.

<Another Display Example of Thumbnail>

Subsequently, another display operation of the wide-angle panorama image 200 by the information processing apparatus 100 will be described.

Figure 4:
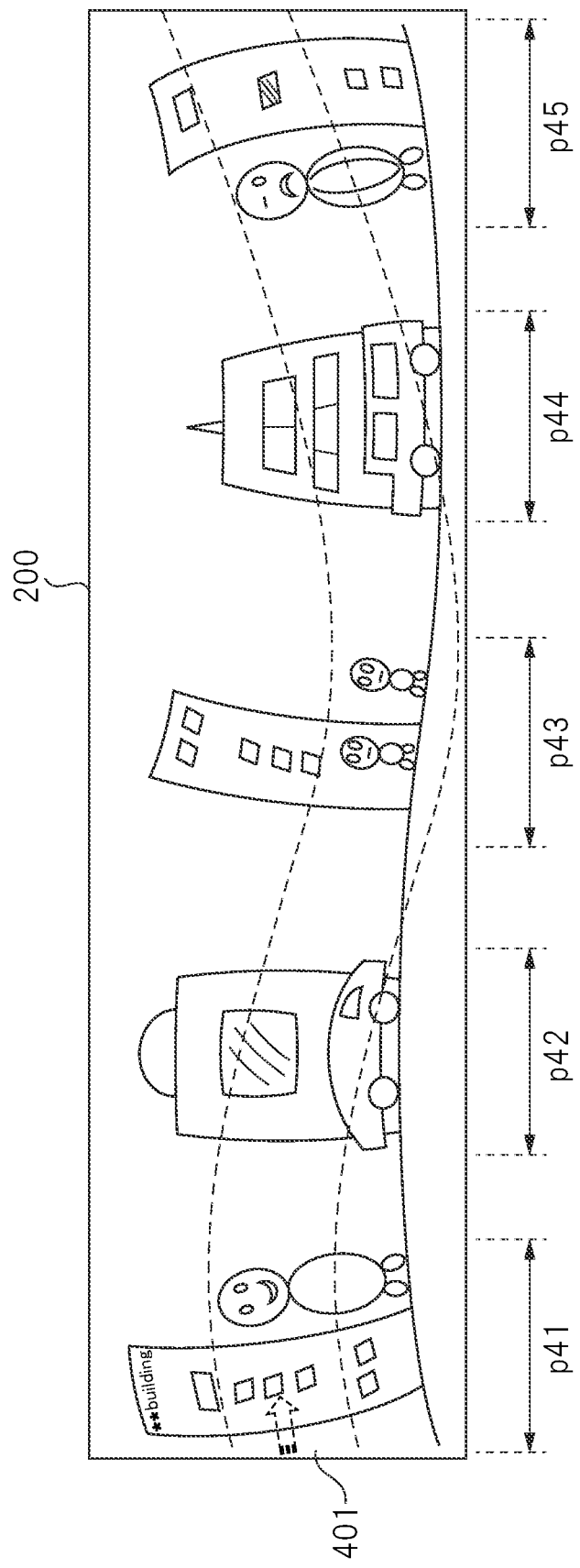
FIG. 4 is an explanatory drawing illustrating another example of the scrolling display process for a wide-angle panorama image by the information processing apparatus illustrated in FIG. 1.

FIG. 4 is an explanatory drawing illustrating another example of the scrolling display process for the wide-angle panorama image 200 by the information processing apparatus 100 illustrated in FIG. 1.

FIG. 4 illustrates an example in which the wide-angle panorama image 200 that is an original image inputted to the information processing apparatus 100 is scrolled and displayed around a characteristic point of a photographic subject.

As the characteristic points of the photographic subject captured in the wide-angle panorama image 200, for example, a face of a person, a place in focus, a place where there is a sudden change in color, and the like are cited. Here, a case where the characteristic point is, for example, a "face of a person" will be described.

First, an input to set "the face of the person" as the characteristic point is carried out in the input operation unit 109. The characteristic point determination processing unit 107 determines a partial image having a "face of a person", which is the characteristic point of the photographic subject set and inputted by the input operation unit 109, and generates characteristic point possessing partial image information indicating a partial image in which the characteristic point is captured.

Then, when thumbnails of the wide-angle panorama image 200 illustrated in FIG. 4 are displayed, as illustrated by a scroll locus 401, the control unit 101 scrolls and displays the wide-angle panorama image 200 in a right direction from the left side of the wide-angle panorama image 200 in accordance with the characteristic point possessing partial image information generated by the characteristic point determination processing unit 107 so as to connect the partial images having "the face of the person", which is the characteristic point after tilt deviation and distortion are corrected.

As a result, it is possible to accurately capture the characteristic point of "the face of the person" from the whole screen of the wide-angle panorama image 200, and it is possible to scroll and display a partial image with a standard angle of view in which tilt deviation and image distortion are corrected as the center. This makes it possible for the user to visually recognize the characteristic point more explicitly when the thumbnails are displayed.

Figure 5:
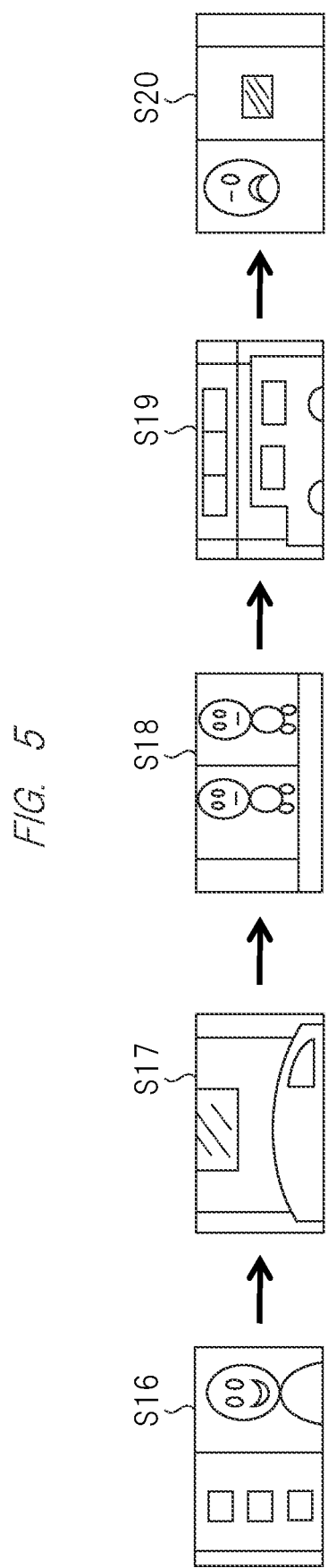
FIG. 5 is an explanatory drawing illustrating a display example of partial images of the wide-angle panorama image that is scrolled and displayed around a characteristic point of a photographic subject as thumbnails of the wide-angle panorama image illustrated in FIG. 4.

FIG. 5 is an explanatory drawing illustrating a display example of partial images of a wide-angle panorama image scrolled and displayed around a characteristic point of a photographic subject as thumbnails of the wide-angle panorama image 200 illustrated in FIG. 4.

FIG. 5 schematically illustrates the partial images that are respectively scrolled and displayed in turn at positions p41 to p45 of the wide-angle panorama image 200 illustrated in FIG. 4.

As illustrated in FIG. 5, partial images of images S16, S17, S18, S19, and S20 are respectively scrolled and displayed at the positions p41, p42, p43, p44, and p45 in the scroll locus 401 illustrated in FIG. 4. Further, the partial images having "the face of the person", which is the characteristic point, are scrolled and displayed at the positions p41, p43, and p45 as the images S16, S18, and S20.

Further, similarly to FIG. 3, in the images S16 to S20, the control unit 101 corrects deviation of a horizontal direction or a vertical direction of an original image in accordance with the horizontal/vertical direction information generated by the horizontal/vertical direction determination processing unit 106, and corrects image distortion of the original image in accordance with the image distortion information generated by the image distortion determination processing unit 105.

This makes it possible to scroll and display, as the center, the characteristic point in the wide-angle panorama image 200, which is the original image, by the partial images with the standard angle of view in which tilt deviation of the horizontal direction or the vertical direction and partial image distortion are corrected. As a result, it is possible to visually recognize the characteristic point extracted from the wide-angle panorama image 200 easily and accurately.

Further, when partial images in each of which the characteristic point is captured are scrolled and displayed, the control unit 101 may display a message indicating "characteristic point display" on the display unit 108, or may emit information such as voice indicating "characteristic point display" by the audio input/output processing unit 110. These notifications can improve usability.

In a case where a plurality of persons is captured as a characteristic point mainly of persons, one person near the center of the cloud may be determined and selected as a main character, for example. Further, in a case where a photographer himself or herself is captured, the photographer himself or herself may be specified as a specific person, or something to which a line of sight of the photographer is directed may be specified as the characteristic point.

In order to visually recognize the characteristic point more explicitly, a display time of the characteristic point may be lengthened, the display may be suspended at a portion of the characteristic point, or an image having the characteristic point may be displayed in a large size.

In a case where the characteristic point is a face, the face may be enlarged and resized, and may be displayed, or a bust-up shot capturing an upper part from a chest may be displayed. For example, in case of the examples described with reference to FIG. 4 and FIG. 5, a display time of the images S16, S18, and S20 illustrated in FIG. 5 in which "the face of the person", which is the characteristic point, is displayed may be lengthened or suspended, or they may be displayed once so as to focus on and take a close up of "the face of the person". This makes it possible to improve visibility further.

Further, in a case where there is a plurality of characteristic points, a particularly important one among the characteristic points may be identified as a main photographic subject, and may be distinguished so that a display time for the particularly important one is lengthened with respect to the other characteristic points.

Here, the case where the original image is the wide-angle panorama image 200 has been described. However, even in a case where the original image is not a wide-angle panorama image but is a standard image that is an image with a standard angle of view, it is possible to scroll and display partial images with a standard angle of view while being moved in a horizontal direction in the similar manner to the case of the wide-angle panorama image. Even in this case, each of the partial images is an image with a standard angle of view in which a tilt of a horizontal direction or a vertical direction, deviation, and partial image distortion are corrected.

In addition, similarly to the wide-angle panorama image 200, partial images obtained by dividing a standard image into two scroll loci, for example, may be scrolled and displayed. It becomes possible to identify thumbnail images more accurately, and this makes it possible to improve visibility greatly.

<Operation Example of Information Processing Apparatus>

Next, an operation of the information processing apparatus 100 will be described in detail.

Figure 6:
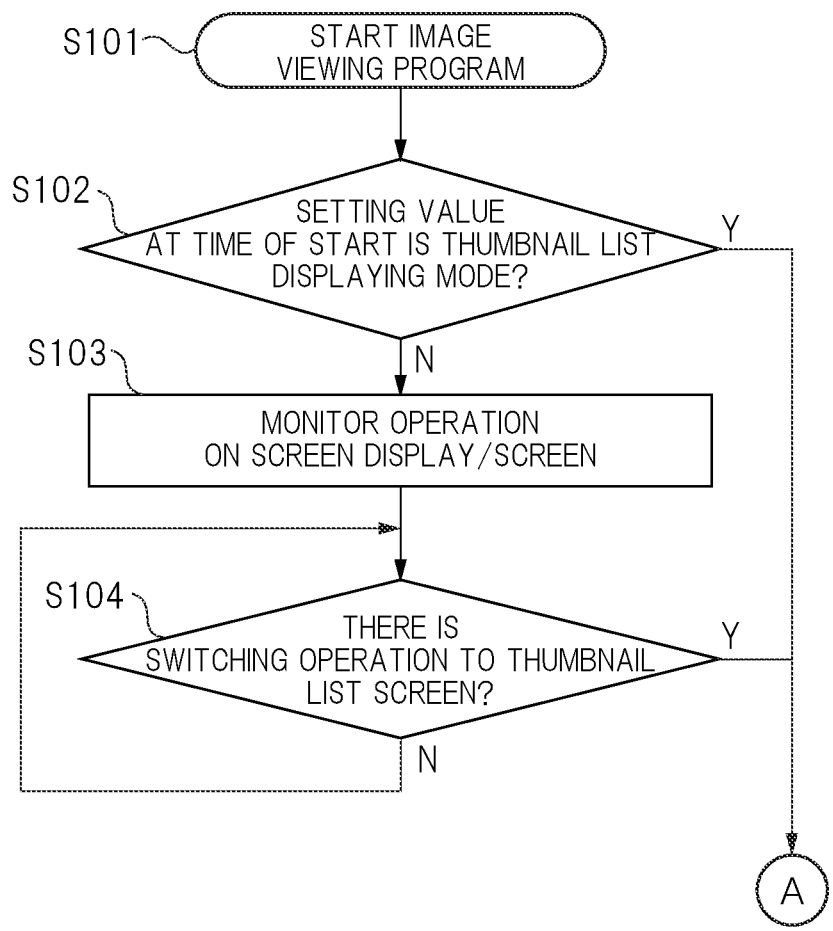
FIG. 6 is a flowchart illustrating one example of operation processing when the thumbnails of the wide-angle panorama image are scrolled and displayed by the information processing apparatus illustrated in FIG. 1.
Figure 7:
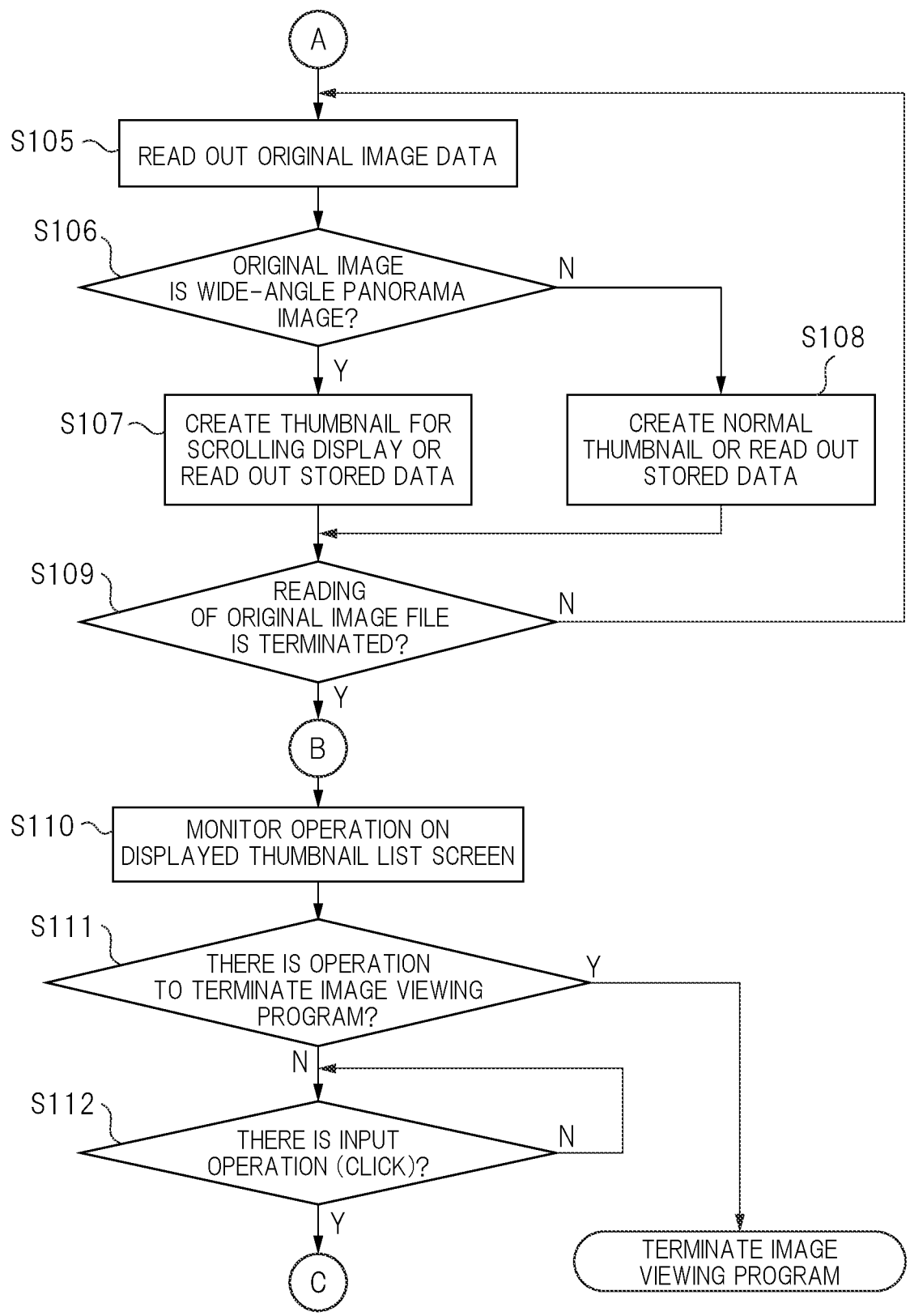
FIG. 7 is a flowchart following FIG. 6.
Figure 8:
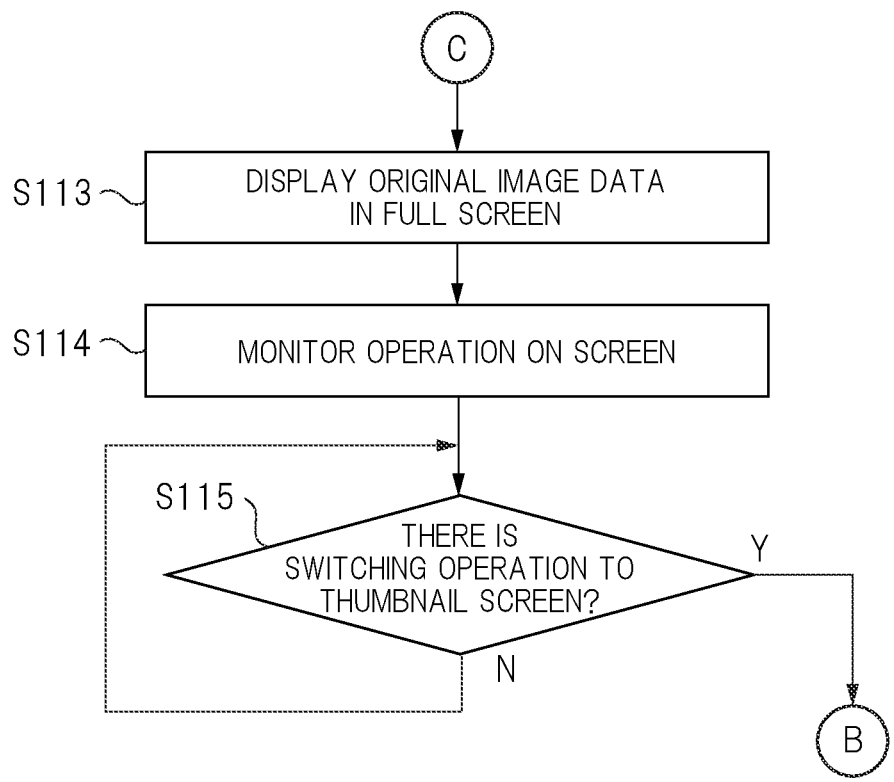
FIG. 8 is a flowchart following FIG. 7.

FIG. 6 is a flowchart illustrating one example of operation processing when thumbnails of a wide-angle panorama image are scrolled and displayed by the information processing apparatus 100 illustrated in FIG. 1. FIG. 7 is a flowchart following FIG. 6. FIG. 8 is a flowchart following FIG. 7.

First, in FIG. 6, when an image viewing program is started by an operation of the user (Step S101), the control unit 101 reads out a startup screen selection setting value from setting data stored in the memory unit 104, and determines whether setting is to display a thumbnail list screen or not (Step S102).

In a case where it is determined that the setting is to display the thumbnail list screen, the control unit 101 shifts to processes at Steps S105 to S110 illustrated in FIG. 7 to display the thumbnail list screen. In a case where it is determined that the setting is not to display the thumbnail list screen, the control unit 101 displays a switching button to the thumbnail list screen or the like on the startup screen of the image viewing program (Step S103).

In a case where the user presses the switching button to the thumbnail list screen from the input operation unit 109 (Step S104), the control unit 101 shifts to the processes at Steps S105 to S110 illustrated in FIG. 7 to display the thumbnail list screen.

As the startup screen selection setting value of the setting data, an initial value determined at the time of creation of the image viewing program may be written to the memory unit 104 when the image viewing program is installed. Alternatively, the user may write a setting value selected by the user at the time of first activation of the image viewing program to the memory unit 104. Alternatively, the user may be allowed to write the setting value by an operation of the image viewing program or the OS (Operating System).

Subsequently, in FIG. 7, the control unit 101 reads out original image data whose display selection is specified from the memory unit 104 on the basis of a display selection specifying list set in the setting data of the image viewing program (Step S105). Here, the original image data are photographed image data or the like, and are image data to be viewed by a full screen.

Note that as the display selection specifying list, at the time of start of the image viewing program, the control unit 101 may cause the display unit 108 to display a dialog encouraging the user to select original image data to be added to the list, or may select all of original image data in a specific folder as the list. Further, the list selected by the user the previous time may be stored and used at the time of the next start.

Then, the control unit 101 determines whether the original image data read out from the memory unit 104 are a wide-angle panorama image or not (Step S106). In a case where it is determined that the original image data thus readout is a wide-angle panorama image, the control unit 101 creates thumbnails for the wide-angle panorama image (Step S107).

The determination of whether the original image data are a wide-angle panorama image or not in the process at Step S106 is made by referring to image information that was added in advance to the original image data at the time of photographing or processing.

Alternatively, the program for controlling the operation stored in the program storage area 103 of the memory unit 104 may analyze characteristics of an image, such as image distortion or an aspect ratio to determine whether the image is a wide-angle panorama image or not, or to determine it by dedicated hardware or the like.

In a case where it is determined that the original image data thus read out is not a wide-angle panorama image, the control unit 101 executes image processing for the original image data thus read out, and creates a thumbnail paired with the original image data (Step S108).

When the process of the original image data read out in the process at Step S105 is terminated (Step S109), the control unit 101 displays a thumbnail list screen by using the thumbnail images created in the process at Step S107 or the process at Step S108 (Step S110).

Note that a list image of thumbnails may be generated by using the thumbnail images created in advance and displayed. In that case, in the process at Step S107 and the process at Step S108, thumbnail image data linked to the original image data and stored in the memory unit 104 are read out, and the list image of the thumbnails is displayed from the thumbnail image thus read out.

Further, when the user specifies the original image data that the control unit 101 does not determine as the wide-angle panorama image by the input operation unit 109, the control unit 101 may create thumbnails for the wide-angle panorama image, and may display the thumbnail list screen by using these images.

Moreover, as the original image data specified as the wide-angle panorama image by the user, a fact that it is the wide-angle panorama image specified by the user is recorded in image information accompanying the original image data. Alternatively, it may be recorded in a setting file of the image viewing program, and the thumbnails for the wide-angle panorama image may be displayed at the time of next display. The thumbnail list screen may be displayed so as to separate the thumbnails for the wide-angle panorama image from normal thumbnails, or may be displayed in a mixed manner.

In a case where an operation to terminate the image viewing program is carried out on the thumbnail list screen (Step S111), the control unit 101 terminates the operation of the image viewing program. The operation to terminate the image viewing program and the terminating process may be carried out from a screen other than the thumbnail list screen.

In a case where the operation to terminate the image viewing program is not carried out (Step S111), the control unit 101 determines whether an operation to select the thumbnail for the wide-angle panorama image is carried out or not (Step S112).

In this case, the selection operation is an operation in which the user Selects the thumbnail for the wide-angle panorama image by the input operation unit 109. For example, in a case where the input operation unit 109 is a mouse, selection by a click or the like is carried out.

In a case where there is a selection operation in the process at Step S112, in FIG. 8, the control unit 101 displays the original image data in a full screen (Step S113). In a case where a thumbnail list screen display button or the like is pressed by the user at the time of this full screen display (Steps S114 and S115), the control unit 101 returns to the process at Step S110 illustrated in FIG. 7, and displays the thumbnail list screen.

Here, the case where the original image data are displayed in the full screen by a click, for example, as the first input operation for the thumbnail has been described. However, an operation as another example (will be described later) may be carried out, and the full screen display may be executed after a portion to be displayed is changed.

By an input operation such as a first click of a thumbnail for a wide-angle panorama image, the control unit 101 suspends the scrolling display of the thumbnail to execute so-called reproduction pause, and waits for a next operation from the user. In a case where the user slides his or her finger on the thumbnail as the next operation, by scrolling a display portion in the thumbnail image in the sliding direction, another surrounding portion different from the portion displayed at the time of suspension is displayed.

When the operation described above is described with reference to FIG. 3, the scrolling display is suspended at the image S8 illustrated in FIG. 3, the user slides the finger toward a left side, for example, in a state where the thumbnail of the image S8 is displayed on the display unit 108.

By this operation, the display in the thumbnail moves in response to motion of the finger, and a partial image of a portion where the finger stops is displayed. For example, in a case where the stopped portion is the image S7 illustrated in FIG. 3, the control unit 101 displays the image S7. The direction in which sliding can be carried out may be limited to the direction of the scrolling display.

In a case where the user remembers a display order of the portions displayed at the time of the scrolling display by the operation described above, it is possible for the user to easily find the remembered portion by limiting the movement in different directions.

Further, the direction of the scrolling display is not limited, and the scrolling display may be freely movable. For example, by sliding down from the image S8, the image S13 illustrated in FIG. 3 may be displayed.

As illustrated in the image S8 of FIG. 3, in a case where a building is displayed in the thumbnail image and the user wants to display a downward direction of the building by this operation, it is possible to move the thumbnail image by a simple operation, and this makes it possible for the user to intuitively move the thumbnail image to an arbitrary display portion.

Further, in a case where the thumbnail image is moved to a direction other than the direction of the scrolling display, the user may be allowed to recognize that the direction is out of the direction of the scrolling display. For example, it is an operation such as leaving for a certain period of time or notification by vibration or sound after the user slides the finger and before the thumbnail display starts to move.

When the scrolling display of the thumbnail is suspended by the first input operation such as a click, the scrolling display may be restarted by a second input operation such as a click, long pressing, a double click, or a double tap, for example. The method of the input operation such as the click or the sliding may be changed appropriately.

<Display Example of Partial Image>

Figure 9:
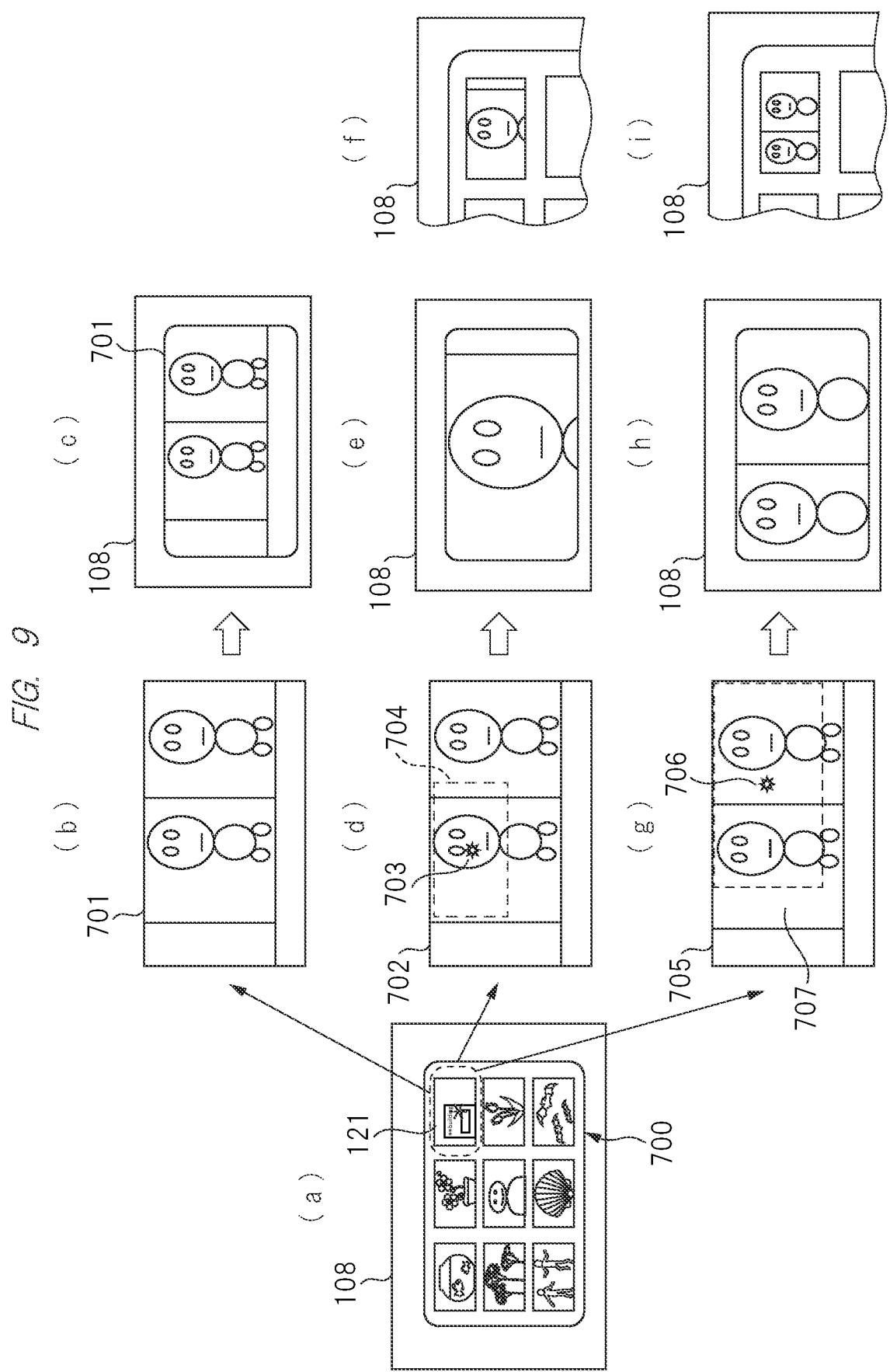
FIG. 9 is an explanatory drawing illustrating one example of display in a partial image displayed as a thumbnail by the information processing apparatus illustrated in FIG. 1.

FIG. 9 is an explanatory drawing illustrating one example of display in a partial image displayed as a thumbnail by the information processing apparatus 100 illustrated in FIG. 1.

When the user selects an arbitrary thumbnail 121 in a thumbnail list screen 700 illustrated in FIG. 9(a) by carrying out a first input operation such as a click, for example, the control unit 101 reads out the original image data of the thumbnail 121 from the memory unit 104.

Then, as illustrated in FIG. 9(c), the control unit 101 causes the display unit 108 to display an image 701 displayed by a thumbnail of original image data illustrated in FIG. 9(b) in a full screen.

When the user selects the thumbnail 121 on the thumbnail list screen 700 illustrated in FIG. 9(a) by a second input operation such as a double click, for example, the control unit 101 displays an image, in which an area according to a photographic subject is adjusted around a click point by the second input operation, that is, by the double click, in the full screen.

In this case, for example, as illustrated in FIG. 9(d), when the click point of the double click is a point 703 for selecting a "face of a person", an area 704 in which the face illustrated in FIG. 9(d) is included or an image of an upper part from a chest illustrated in FIG. 9(e) is displayed on the display unit 108 in the full screen.

Alternatively, at the time of the double click, an image in the area 704 may be displayed in a display area of the thumbnail 121 illustrated in FIG. 9(a). FIG. 9(f) illustrates an example in which the image of the area 704 is displayed in the display area of the thumbnail 121 illustrated in FIG. 9(a).

By displaying, in a large size, an image obtained by cutting out an image around a photographic subject photographed at a point specified by the second input operation such as the double click, for example, "the face of the person" and enlarging the cut-out image in the full screen or a thumbnail display screen in this manner, the user can explicitly identify the specified photographic subject. As a result, it is possible to improve visibility of the thumbnails.

Further, in a case where the user carries out selection of an arbitrary thumbnail on the thumbnail list screen 700, for example, by a third input operation such as a triple click, as illustrated in FIG. 9(g), the control unit 101 displays an image of the maximum rectangular area 707 that falls within an aspect ratio of the full screen display around a point 706 at which the user carries out the triple click in the full screen as illustrated in FIG. 9(h). Alternatively, as illustrated in FIG. 9(i), the image of the area 707 may be displayed in the display area in which the thumbnail 121 illustrated in FIG. 9(a) is displayed.

Further, for example, in a case where a part of the face is not displayed in the thumbnail and a non-displayed portion exists in the original image data, the control unit 101 may generate an image of an area that is not included in a display area of a current thumbnail but in which the face is included, or an image of an area where a state of an upper part from a chest is displayed from the original image data, and display it in the full screen.

Moreover, in a case where a thumbnail is selected by a fourth input operation that is different from the first input operation, the second input operation, or the third input operation described above, the whole original image may be displayed regardless of the display area of the thumbnail.

In a case where the whole original image is displayed, the control unit 101 may execute image processing so that a location of the thumbnail when the input operation is carried out becomes the center of the original image, and display the thumbnail. In a case where the original image data is an image such as a 360° entire celestial sphere image in which a direction of the line of sight can be reset freely, for example, the control unit 101 can change the location to be displayed into the center by executing the image processing, and display the thumbnail.

The method of the input operation can be changed appropriately. For example, the first input operation may be a double click. The method of the input operation is not limited to the operation on the screen, and may be an operation using a physical button or another input device, for example.

The method of the input operation and a combination of the operations may be stored in the memory unit 104 as setting values. The control unit 101 may read out the setting values from the memory unit 104 at the time of the next start, and may be able to use the same combination as the previous time.

Further, for the same input operation, the control unit 101 may determine the image content of the thumbnail image, and change the operation. For example, in a case where a person that is a main photographic subject is selected even by the same input operation as illustrated in FIG. 9(d), the control unit 101 displays the area 704 in which the photographic subject is selected as the center in the full screen as illustrated in FIG. 9(e).

In a case where a background other than the photographic subject, for example, is selected like the point 706 illustrated in FIG. 9(g), the control unit 101 executes operation change such that the area 707 illustrated in FIG. 9(g) selected by the aspect ratio is displayed in the full screen as illustrated in FIG. 9(h).

As described above, it is possible to provide thumbnail images with good visibility when thumbnails of a wide-angle panorama image are displayed.

Second Embodiment

<Configuration Example of Information Processing Apparatus>

Figure 10:
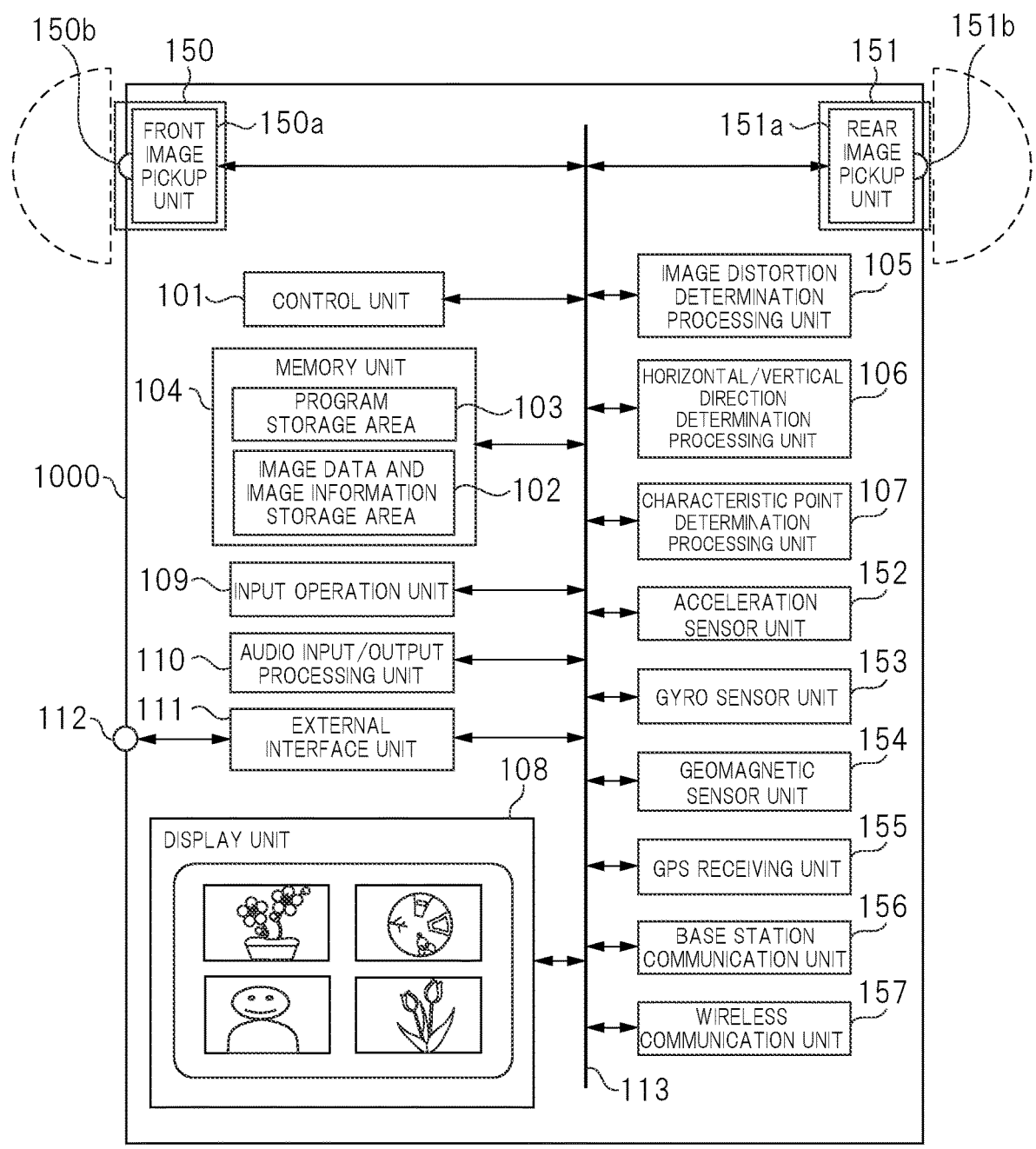
FIG. 10 is an explanatory drawing illustrating one example of a configuration of an information processing apparatus according to a second embodiment.

FIG. 10 is an explanatory drawing illustrating one example of an information processing apparatus 100 according to a second embodiment.

In this case, the information processing apparatus 100 illustrated in FIG. 10 is composed of a portable information terminal or the like that has a camera function, such as a smartphone or a tablet, for example. The information processing apparatus 100 illustrated in FIG. 10 is configured so as to newly include camera units (or cameras) 150 and 151, an acceleration sensor unit (or an acceleration sensor) 152, a gyro sensor unit (or a gyro sensor) 153, a geomagnetic sensor unit (or a geomagnetic sensor) 154, a GPS receiving unit (or a GPS receiver) 155, abase station communication unit (or a base station communication device) 156, and a wireless communication unit (or a wireless communication device) 157 in addition to the control unit 101, the memory unit 104, the image distortion determination processing unit 105, the horizontal/vertical direction determination processing unit 106, the characteristic point determination processing unit 107, the display unit 108, the input operation unit 109, the audio input/output processing unit 110, the external interface unit 111, and the external input/output terminal 112 included in the information processing apparatus 100 illustrated in FIG. 1.

Each of these newly including functional blocks is also connected to each other via a bus 113 in the similar manner to that illustrated in FIG. 1. Since the other connection configuration is similar to that illustrated in FIG. 1, explanation thereof will be omitted.

The camera unit 150 is configured by a front image pickup unit 150a and a lens for photographing 150b. The lens for photographing 150b is provided on a front side of the information processing apparatus 100. The front image pickup unit 150a photographs a scene captured by the lens for photographing 150b.

The lens for photographing 150b is a wide-angle lens, and may be a fisheye lens or the like, for example. The fisheye lens can capture a scene in a range of approximately 180° in vertical and horizontal directions thereof. This makes it possible to photograph a panoramic view of the front side at a wide angle.

The camera unit 151 is configured by a rear image pickup unit 151a and a lens for photographing 151b. The lens for photographing 151b is provided on a rear side of the information processing apparatus 100. The rear image pickup unit 151a photographs a scene captured by the lens for photographing 151b.

The lens for photographing 151b is also a wide-angle lens, and may be a fisheye lens or the like, for example, in the similar manner to the lens for photographing 150b. This also makes it possible to photograph a panoramic view of the rear side at a wide angle.

Further, the front image pickup unit 150a generates second sensor information that indicates a photographing distortion state caused by the lens for photographing 150b, and outputs the second sensor information to the image distortion determination processing unit 105. Similarly, the rear image pickup unit 151a generates second sensor information that indicates a photographing distortion state caused by the lens for photographing 151b, and outputs the second sensor information to the image distortion determination processing unit 105.

The image distortion determination processing unit 105 uses the second sensor information generated by each of the front image pickup unit 150a and the rear image pickup unit 151a to execute a process of determining distortion of the image photographed by each of the camera units 150 and 151.

Note that a well-known technique generally used in image processing may be utilized for the process of determining and correcting the distortion of the photographed image by the image distortion determination processing unit 105. For example, in case of the fisheye lens, there is known a technique for correcting distortion of an image by the fisheye lens by using a plane in contact with an arbitrary point on a virtual spherical model as a screen to convert coordinates of a point on the virtual spherical model into coordinates of a point on the plane screen.

The acceleration sensor unit 152 is a sensor configured to detect acceleration, and can detect gravity. By detecting the gravity by this acceleration sensor unit 152, it is possible to detect a tilt of the information processing apparatus 100 in the vertical direction.

Therefore, the acceleration sensor unit 152 can detect a tilt of each of the images photographed by the camera units 150 and 151 in the horizontal direction and the vertical direction. Specifically, the acceleration sensor unit 152 generates first sensor information that indicates a photographing state of the image photographed by the camera unit 150 or the camera unit 151 such as the tilt thereof in the horizontal direction or the vertical direction, and outputs the first sensor information to the horizontal/vertical direction determination processing unit 106.

The gyro sensor unit 153 is a sensor configured to detect angular velocity of the information processing apparatus 100 in a rotational direction thereof. The geomagnetic sensor unit 154 is a sensor configured to detect magnetic force of the earth, and detects a direction of the information processing apparatus 100.

The GPS receiving unit 155 receives signals from GPS (Global Positioning System) satellites in the sky to detect a current position of the information processing apparatus 100. These various kinds of sensors allow the position and movement of the information processing apparatus 100 to be detected in detail.

The base station communication unit 156 is a communication interface that executes long-distance wireless communication with a base station such as W-CDMA (Wideband Code Division Multiple Access) or GSM (Global System for Mobile Communications) (registered trademark), and executes transmission and reception of information or voice communication via a transmitting and receiving antenna (not illustrated in the drawings).

The wireless communication unit 157 is a communication interface that executes wireless communication with a router or the like via a wireless LAN (Local Area Network), and is connected to an external network via the router to transmit and receive information.

Note that in a case where thumbnails of an original image that has not been photographed by any of the camera units 150 and 151 of the information processing apparatus 100 are to be displayed, in FIG. 1, the example in which the wide-angle panorama image, which is the original image, is inputted to the external interface unit 111 via the external input/output terminal 112 has been described, but in the information processing apparatus 100 illustrated in FIG. 10, the original image may be inputted via the base station communication unit 156 and the wireless communication unit 157.

Thus, by providing the acceleration sensor unit 152 for generating the first sensor information, and the front image pickup unit 150a and the rear image pickup unit 151a for generating the second sensor information, it is possible to correct tilt deviation of the horizontal direction or the vertical direction of the original image, image distortion, and the like accurately to display the thumbnails. This makes it possible to enable further higher visibility when thumbnails of a wide-angle panorama image are displayed.

<Processing Example of Thumbnail Image>

Subsequently, an operation of the information processing apparatus 100 illustrated in FIG. 10 will be described.

Figure 11:
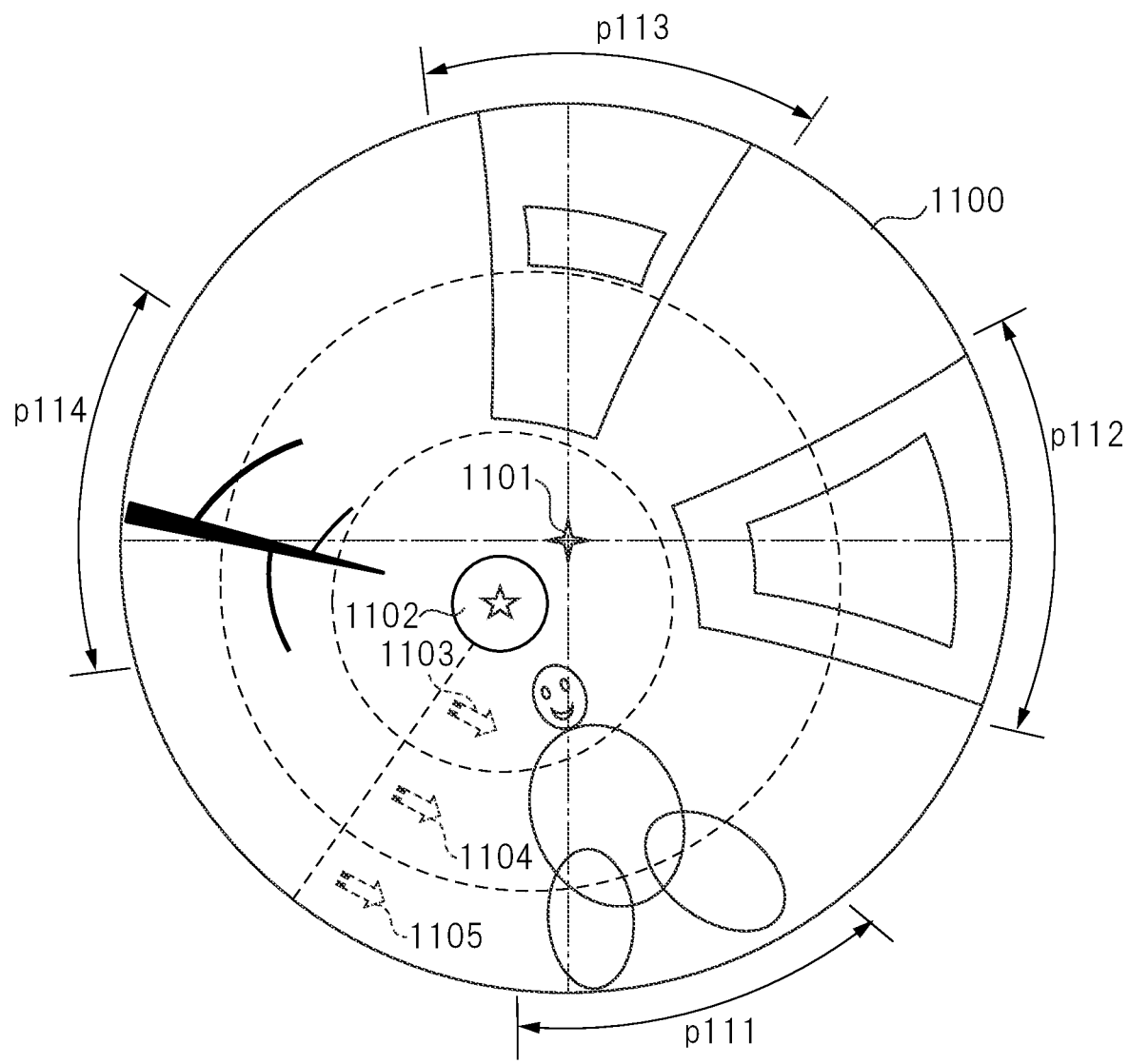
FIG. 11 is an explanatory drawing illustrating one example of display when a wide-angle panorama image photographed by a camera unit that is included in the information processing apparatus illustrated in FIG. 10 is scrolled and displayed.

FIG. 11 is an explanatory drawing illustrating one example of display when a wide-angle panorama image 1100 photographed by the camera unit 150 or the camera unit 151 that is included in the information processing apparatus 100 illustrated in FIG. 10 is scrolled and displayed.

FIG. 11 illustrates an example in which the wide-angle panorama image 1100 is photographed by using the lens for photographing 150b or 151b that is the fisheye lens. As illustrated in FIG. 11, its photographing range becomes the wide-angle panorama image 1100 with a spherical shape of 360° that reaches 360° in a horizontal direction and 180° in a vertical direction.

In FIG. 11, a point 1101 indicates a central position of the wide-angle panorama image 1100 with the spherical shape of 360°, and a point 1102 indicates a zenith position of the wide-angle panorama image 1100. In this case, FIG. 11 illustrates an example in which the point 1102 that is the zenith position is deviated from the point 1101 that is the central position of the image due to a tilt of the information processing apparatus 100.

When thumbnails of the wide-angle panorama image 1100 with the spherical shape of 360° illustrated in FIG. 11 are displayed, the control unit 101 first displays respective partial images like a moving image while scrolling in a counterclockwise direction of the wide-angle panorama image 1100 along the horizontal direction of the wide-angle panorama image 1100 in a scroll locus 1103 centered on the point 1102. The horizontal direction is determined from horizontal/vertical direction information that is determined and generated from the first sensor information by the horizontal/vertical direction determination processing unit 106.

At this time, a standard angle of view in which a tilt of the image, deviation, and image distortion are corrected is in turn displayed for the partial images. In the displayed partial image, the control unit 101 corrects the tilt of the image, the deviation, and the image distortion from the horizontal/vertical direction information and image distortion information.

As described above, the horizontal/vertical direction determination processing unit 106 generates the horizontal/vertical direction information in accordance with the first sensor information, and the image distortion determination processing unit 105 generates the image distortion information in accordance with the second sensor information.

The control unit 101 displays the thumbnails of the partial images with the standard angle of view after correction while scrolling in the counterclockwise direction of the wide-angle panorama image 1100 in a scroll locus 1104, which is a scroll locus that covers an outer periphery of the scroll locus 1103 after scrolling display while circling in the scroll locus 1103 on the wide-angle panorama image 1100.

Subsequently, the control unit 101 scrolls and displays the partial images after correction with the standard angle of view while scrolling in the counterclockwise direction of the wide-angle panorama image 1100 in a scroll locus 1105, which is a scroll locus that covers an outer periphery of the scroll locus 1104 in the similar manner to the scroll loci 1103 and 1104.

As a result, it is possible to scroll and display the whole screen of the wide-angle panorama image 1100 by the partial images with the standard angle of view in which tilt deviation and distortion in the image are corrected. Therefore, it is possible to improve visibility greatly.

Note that a rotational direction in the scrolling display, that is, a scrolling direction of the scroll loci 1103, 1104, and 1105 may be a clockwise direction opposite to the counterclockwise direction. Further, a start position of the rotational direction may be any position.

<Display Example of Scrolling>

Figure 12:
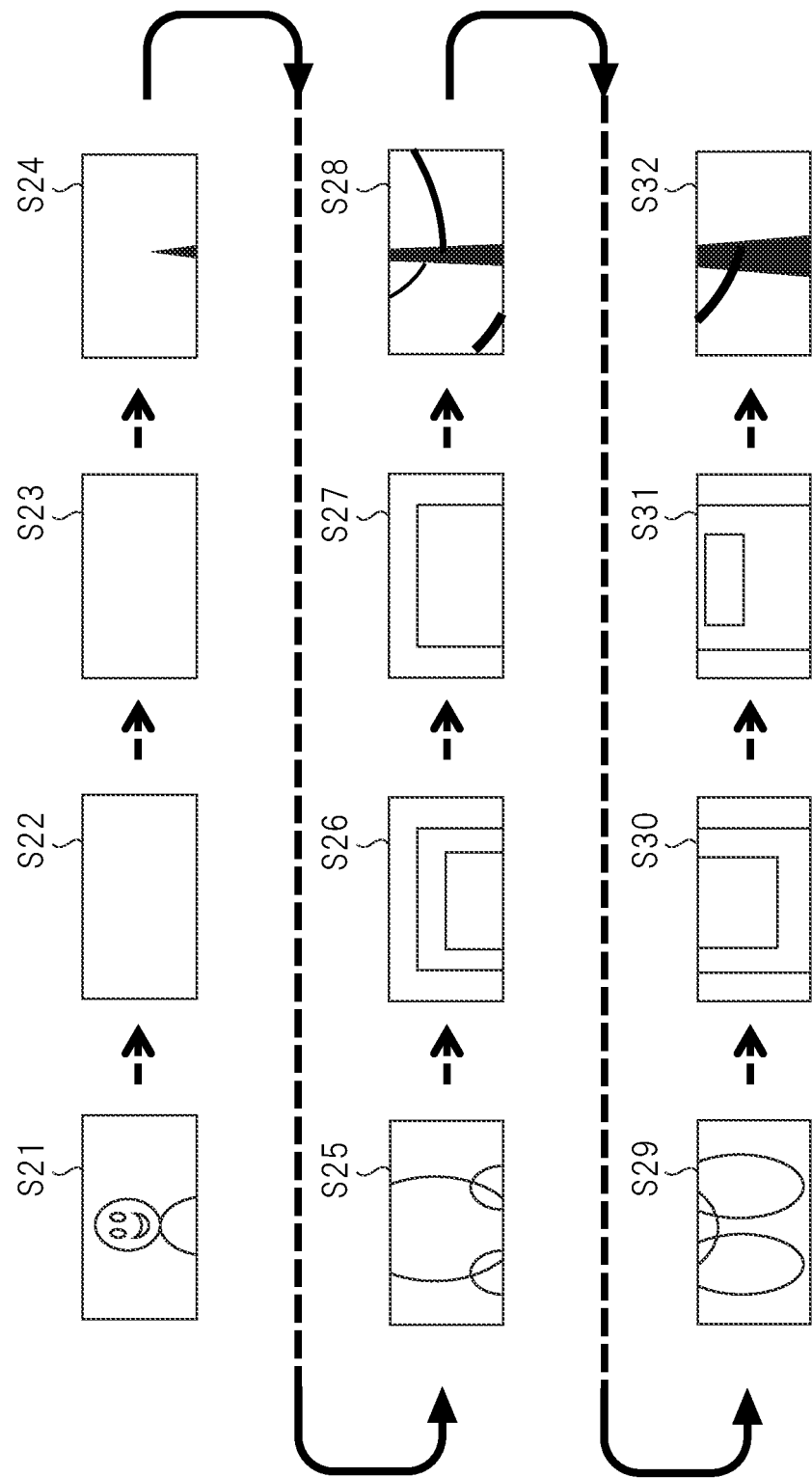
FIG. 12 is an explanatory drawing illustrating one example of scrolling display for partial images of the wide-angle panorama image illustrated in FIG. 11.

FIG. 12 is an explanatory drawing illustrating one example of scrolling display partial images of the wide-angle panorama image 1100 illustrated in FIG. 11.

FIG. 12 schematically illustrates the partial images displayed in turn when the wide-angle panorama image 1100 with the spherical shape of 360° illustrated in FIG. 11 is scrolled and displayed.

Images S21 to S24 illustrated in FIG. 12 are partial images after correction displayed while scrolling in the scroll locus 1103 illustrated in FIG. 11. These images S21 to S24 are respective partial images at positions p111, p112, p113, and p114 of the wide-angle panorama image 1100 in the scroll locus 1103 illustrated in FIG. 11.

Images S25 to S28 illustrated in FIG. 12 are partial images after correction displayed while scrolling in the scroll locus 1104 illustrated in FIG. 11. These images S25 to S28 are respective partial images at the positions p111, p112, p113, and p114 of the wide-angle panorama image 1100 in the scroll locus 1104 illustrated in FIG. 11.

Images S29 to S32 illustrated in FIG. 12 are partial images after correction displayed while scrolling in the scroll locus 1105 illustrated in FIG. 11. These images S29 to S32 are respective partial images at the positions p111, p112, p113, and p114 of the wide-angle panorama image 1100 in the scroll locus 1105 illustrated in FIG. 11.

Thus, in the scroll locus 1103, the partial images of the images S21, S22, S23, and S24 illustrated in FIG. 12 are respectively scrolled and displayed. In the scroll locus 1104, the partial images of the images S25, S26, S27, and S28 illustrated in FIG. 12 are respectively scrolled and displayed. In the scroll locus 1105, the partial images of the images S29, S30, S31, and S32 illustrated in FIG. 12 are respectively scrolled and displayed.

By continuously scrolling and displaying the images S21 to S32, which are the partial images with the standard angle of view in which tilt deviation of the horizontal direction or the vertical direction and partial image distortion are corrected, in the horizontal direction, it is possible to display the thumbnails as if it were a moving image.

As a result, it is possible to visually recognize the whole wide-angle panorama image 1100 with the spherical shape of 360°, which is the original image, in every corner thereof in a state where the photographic subject is easily viewed accurately.

Note that the display order of the partial images is not limited to the order of the image S21 to the image S32 described above. For example, in order to facilitate grasping of the position of the partial image in the whole wide-angle panorama image 1100, they may be displayed in the order of the image S21, the image S22, the image S23, the image S24, the image S28, the image S25, the image S26, the image S27, the image S31, the image S32, the image S29, and the image S30.

Alternatively, the partial images may be displayed in a spiral shape so as to move downward by a vertical length of each partial image between the image S21 and the image S25 in the horizontal direction of 360°. By setting a length of vertical movement among the horizontal direction of 360° to be less than the vertical length of each partial image, a part thereof may be overlapped and displayed in the spiral shape.

<Another Example of Scrolling Display>

Figure 13:
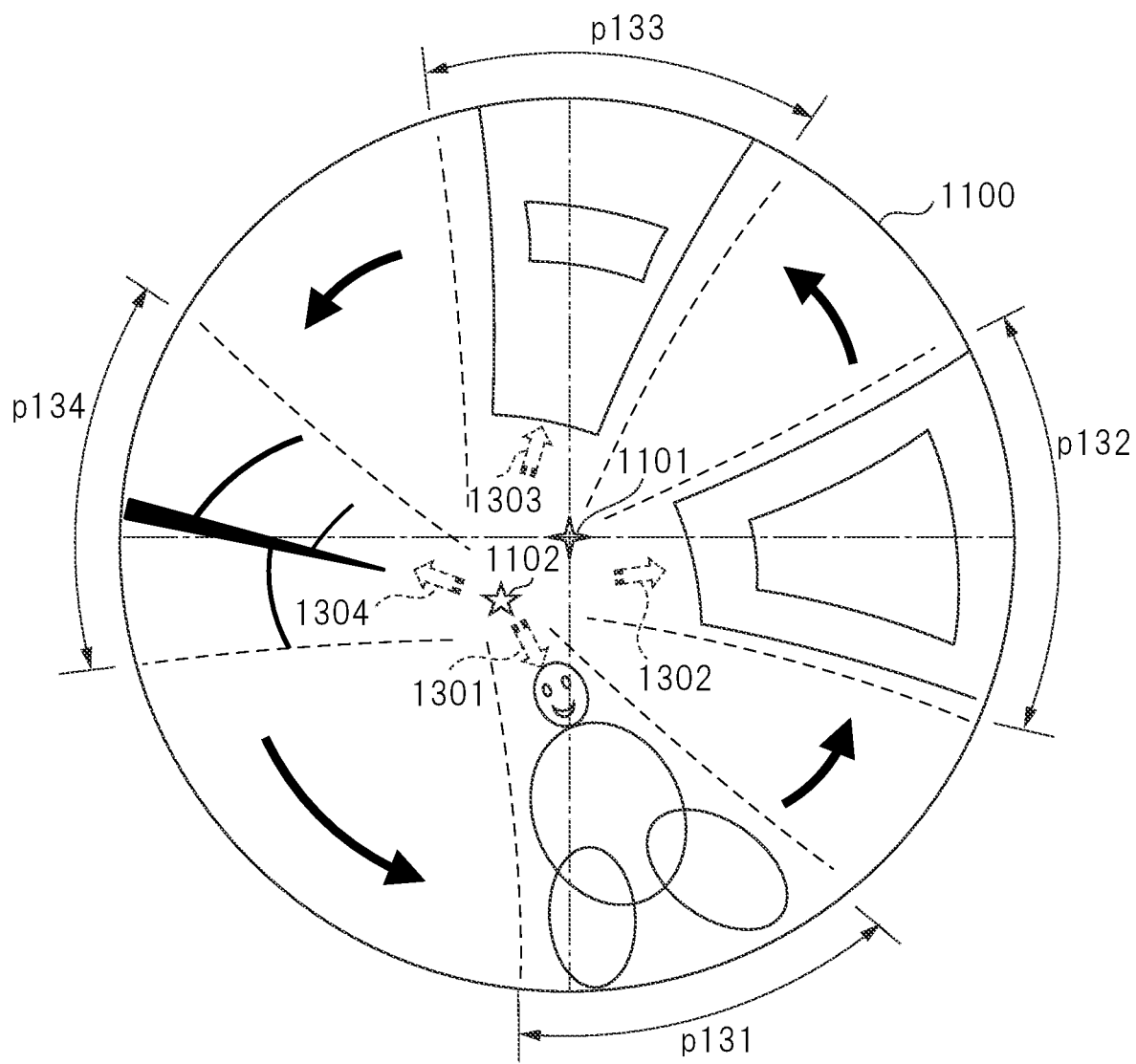
FIG. 13 is an explanatory drawing illustrating another example of display when a wide-angle panorama image photographed by the camera unit that is included in the information processing apparatus illustrated in FIG. 10.

FIG. 13 is an explanatory drawing illustrating another display example when the wide-angle panorama image 1100 photographed by the camera unit 150 or the camera unit 151 included in the information processing apparatus 100 illustrated in FIG. 10 is scrolled and displayed.

FIG. 13 illustrates an example in a case where the wide-angle panorama image 1100 of the spherical shape of 360° is scrolled and displayed in a vertical direction different from the direction illustrated in FIG. 11. Namely, a scroll locus is different from that illustrated in FIG. 11.

When the thumbnails of the wide-angle panorama image 1100 are displayed, as illustrated in FIG. 13, first, in a scroll locus 1301, partial images are scrolled and displayed in the vertical direction toward a position directly underneath from a zenith position of an uppermost portion at a position p131 of the wide-angle panorama image 1100, in other words, toward an outer periphery of the wide-angle panorama image 1100.

Then, in a scroll locus 1302, partial images are similarly scrolled and displayed from the zenith position of the uppermost portion to the position directly underneath at a position p132 in which the position illustrated in FIG. 13 is moved in a counterclockwise direction. Similarly, in a scroll locus 130, partial images are scrolled and displayed in the vertical direction from the zenith position to the position directly underneath, in other words, toward the outer periphery of the wide-angle panorama image 1100 at a position p133 of the wide-angle panorama image 1100.

Then, in a scroll locus 1304, partial images are scrolled and displayed in the vertical direction from the zenith position of the uppermost portion to the position directly underneath, in other words, toward the outer periphery of the wide-angle panorama image 1100 at a position p134 of the wide-angle panorama image 1100.

As a result, in case of a photographic subject that extends in the vertical direction such as a tall building or a person, it is possible to scroll and display the partial images, in which tilt deviation of the horizontal direction or the vertical direction and image distortion are corrected, around the photographic subject without removing the photographic subject as a target.

Figure 14:
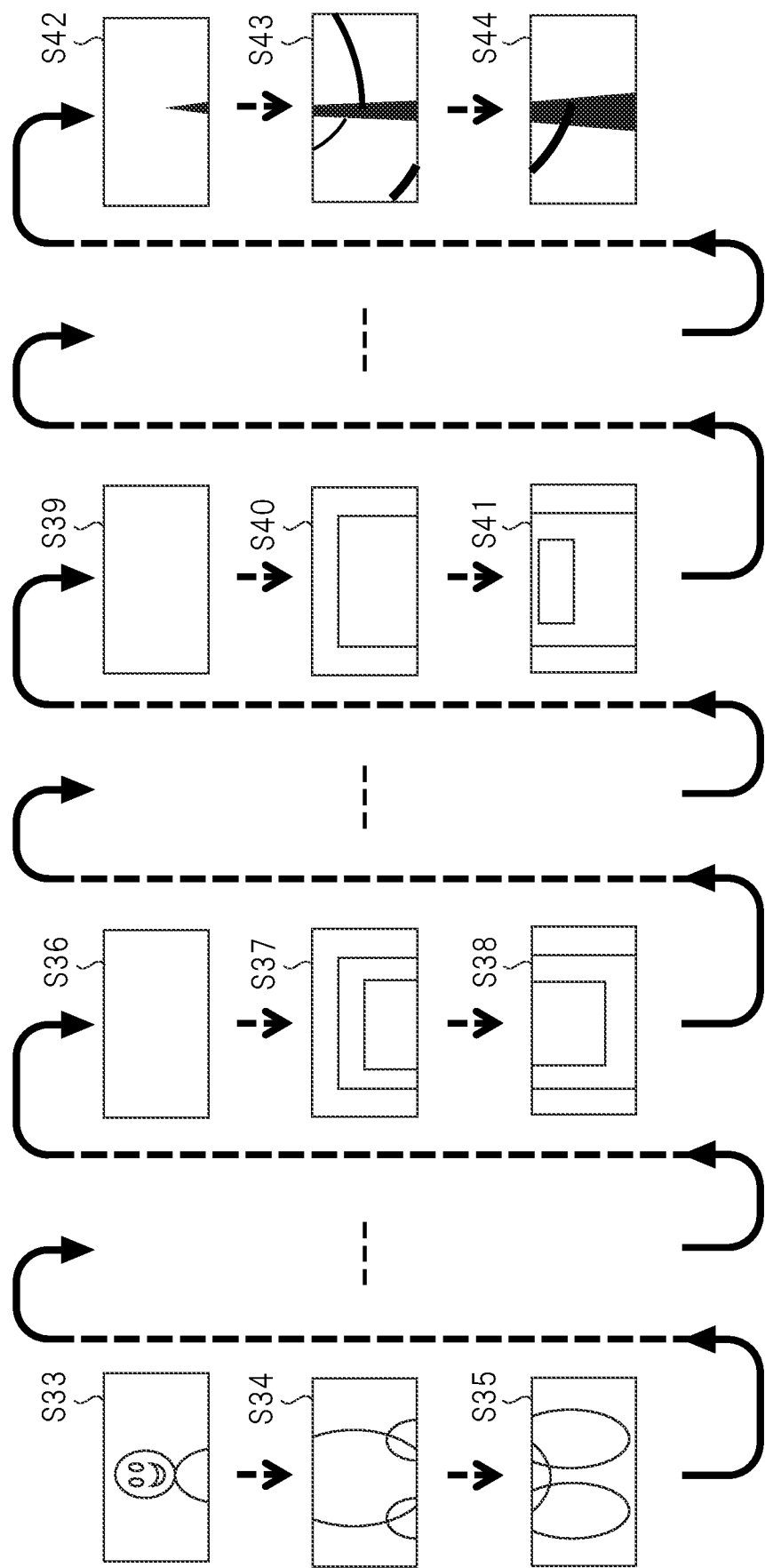
FIG. 14 is an explanatory drawing illustrating one example of scrolling display for partial images of the wide-angle panorama image illustrated in FIG. 13.

FIG. 14 is an explanatory drawing illustrating one example of scrolling display for partial images of the wide-angle panorama image 1100 illustrated in FIG. 13.

FIG. 14 schematically illustrates the partial images that are in turn displayed when the wide-angle panorama image 1100 with the spherical shape of 360° illustrated in FIG. 13 is scrolled and displayed.

At the positions p131, p132, p133, and p134 of the wide-angle panorama image 1100 illustrated in FIG. 13, in the scroll locus 1301, partial images after correction illustrated in an image S33 to an image S35 are respectively scrolled and displayed.

In the scroll locus 1302, partial images after correction illustrated in an image S36 to an image S38 are respectively scrolled and displayed. In the scroll locus 1303, partial images after correction illustrated in an image S39 to an image S41 are respectively scrolled and displayed. In the scroll locus 1304, partial images after correction illustrated in an image S42 to an image S44 are respectively scrolled and displayed.

Thus, by continuously displaying the images S33 to S44, which are the partial images with the standard angle of view in which the tilt deviation of the horizontal direction or the vertical direction and the partial image distortion are corrected, in the vertical direction, it is possible to display the scrolling display as if it were a moving image.

This makes it possible to visually recognize the photographic subject in every corner thereof accurately and with good visibility even though the photographic subject of the wide-angle panorama image 1100 is a photographic subject extended in the vertical direction.

Note that a right or left moving direction of the scrolling display may be a clockwise direction, and a start position of the moving direction may be any position. As the scrolling display direction, the partial images may be scrolled and displayed in the vertical direction from a position directly underneath to the zenith position. Further, the partial images may be scrolled and displayed at a certain position from the position directly underneath to an upper side, that is, in a zenith direction, and may further be scrolled and displayed to the position directly underneath of the opposite side after passing through the zenith position.

In this case, for example, there is an effect that it is possible to visually recognize a pattern scenery of the ceiling accurately without interruption even in a building such as a church.

Note that the image data photographed by the camera unit 150 or the camera unit 151 in the information processing apparatus 100 illustrated in FIG. 10 and the first sensor information and the second sensor information accompanying the image data can also be outputted from the external interface unit 111 to the information processing apparatus 100 illustrated in FIG. 1 via the external input/output terminal 112.

Alternatively, the first sensor information and the second sensor information may be outputted to the information processing apparatus 100 illustrated in FIG. 1 via the base station communication unit 156 or the wireless communication unit 157. In this case, it is apparent that the information processing apparatus 100 illustrated in FIG. 1 can obtain the similar operations and effects to those of the information processing apparatus 100 illustrated in FIG. 10.

Further, the case where the still image is used as the original image has been described as an example. However, the original image may be a moving image. In a case where the original image is a moving image, a characteristic scene is cut out as a still image, and thumbnails of partial images thus cut out are displayed. Alternatively, scenes in which a characteristic image is caught in time series of the moving image may be extracted, and thumbnails may be displayed by combining the scenes.

As described above, the invention made by inventors of the present application has been described specifically on the basis of the embodiments. However, the present invention is not limited to the embodiments described above, and it goes without saying that the present invention may be modified into various forms without departing from the substance thereof.

Note that the present invention is not limited to the embodiments described above, and various modifications are contained. For example, the embodiments described above have been explained in detail for explaining the present invention clearly. The present invention is not necessarily limited to one that includes all configurations that have been explained.

Further, a part of the configuration of one embodiment can be replaced by a configuration of the other embodiment. Further, a configuration of the other embodiment can be added to a configuration of one embodiment. Further, a part of the configuration of each of the embodiments can be added to the other configuration, deleted, or replaced thereby.

REFERENCE SIGNS LIST 100 information processing apparatus, 101 control unit, 102 image data and image information storage area, 103 program storage area, 104 memory unit, 105 image distortion determination processing unit, 106 horizontal/vertical direction determination processing unit, 107 characteristic point determination processing unit, 108 display unit, 109 input operation unit, 110 audio input/output processing unit, 111 external interface unit, 112 external input/output terminal, 113 bus, 150 camera unit, 150a front image pickup unit, 150b lens for photographing, 151 camera unit, 151a rear image pickup unit, 151b lens for photographing, 152 acceleration sensor unit, 153 gyro sensor unit, 154 geomagnetic sensor unit, 155 GPS receiving unit, 156 base station communication unit, and 157 wireless communication unit.

The invention claimed is:

1. An information processing apparatus comprising:
an interface configured to obtain a wide-angle panorama image;
a control circuitry configured to control image processing for the wide-angle panorama image; and
a display,
wherein the control circuitry is configured to:
extract, from the wide-angle panorama image, a plurality of partial images based on one or more characteristic points set in advance;
correct each of the plurality of partial images based on each of correction information generated corresponding to the each of the plurality of partial images; and
cause the display to scroll and display, as a thumbnail image, the corrected plurality of partial images sequentially in an order corresponding to positional relationship of the each of the plurality of partial images in the wide-angle panorama image without displaying an image area other than the plurality of partial images in the wide-angle panorama image.

2. The information processing apparatus according to claim 1, wherein the control circuitry is configured to:
generate horizontal/vertical direction information, as the correction information, for correcting deviation of each of a horizontal direction and a vertical direction of the partial image composed of an arbitrary image area of the wide-angle panorama image on a basis of first sensor information, the first sensor information indicating a tilt of each of a horizontal and a vertical direction of the wide-angle panorama image;
generate image distortion information, as the correction information, for correcting image distortion of the partial image on a basis of second sensor information, the second sensor information indicating a state of photographing distortion caused by a lens for photographing; and
correct the deviation of each of the horizontal direction and the vertical direction of the partial image and the image distortion in accordance with the generated horizontal/vertical direction information and the generated image distortion information.

3. The information processing apparatus according to claim 1,
wherein the control circuitry is configured to cause the display to scroll and display the partial image corrected along a horizontal direction of the wide-angle panorama image.

4. The information processing apparatus according to claim 2,
wherein each of the first sensor information and the second sensor information is photographing information accompanying image data of the wide-angle panorama image.

5. The information processing apparatus according to claim 1,
wherein the thumbnail image that the control circuitry causes the display to display has an aspect ratio of 3:4 or an aspect ratio of 9:16.

6. The information processing apparatus according to claim 1, further comprising:
an input operation interface to which operation information is inputted,
wherein the input operation interface inputs operation information by each of a first input operation and a second input operation,
wherein the first input operation is an input operation for selecting and specifying an arbitrary partial image thus scrolled and displayed,
wherein the second input operation is an input operation for enlarging and displaying the partial image selected by the first input operation, and
wherein the control circuitry is configured to:
enlarge an image in which an area according to a photographic subject is adjusted around a point specified by the input operation interface when the operation information by the second input operation is inputted from the input operation interface; and
cause the display to display the enlarged image.

7. The information processing apparatus according to claim 1, further comprising:
an input operation interface configured to input operation information,
wherein the input operation interface inputs operation information by each of a first input operation and a second input operation,
wherein the first input operation is an input operation for selecting and specifying an arbitrary partial image thus scrolled and displayed,
wherein the second input operation is an input operation for enlarging and displaying the partial image selected by the first input operation, and
wherein the control circuitry is configured to:
enlarge an image of a photographic subject near a point specified by the input operation interface when the operation information by the second input operation is inputted from the input operation interface; and
cause the display to display the enlarged image.

8. An information processing apparatus comprising:
a camera configured to photograph a wide-angle panorama image;
an acceleration sensor configured to detect a tilt of the camera in a vertical direction;
a control circuitry configured to control image processing for the wide-angle panorama image; and
a display,
wherein the acceleration sensor is configured to generate first sensor information indicating a tilt of each of horizontal and vertical directions of the wide-angle panorama image when the camera photographs,
wherein the camera is configured to generate second sensor information that indicates photographing distortion caused by a lens for photographing included by the camera, and
wherein the control circuitry is configured to:
extract, from the wide-angle panorama image, a plurality of partial images based on one or more characteristic points set in advance;
correct each of the plurality of partial images based on each of correction information generated in accordance with the first sensor information and the second sensor information, the generated correction information corresponding to the each of the plurality of partial images; and
cause the display to scroll and display, as a thumbnail image, the corrected plurality of partial images sequentially in an order corresponding to positional relationship of the each of the plurality of partial images in the wide-angle panorama image without displaying an image area other than the plurality of partial images in the wide-angle panorama image.

9. The information processing apparatus according to claim 8, wherein the control circuitry is configured to:
generate horizontal/vertical direction information, as the correction information, for correcting deviation of each of a horizontal direction and a vertical direction of the partial image composed of an arbitrary image area of the wide-angle panorama image on a basis of the first sensor information;
generate image distortion information, as the correction information, for correcting image distortion of the partial image on a basis of second sensor information; and correct the deviation of each of the horizontal direction and the vertical direction of the partial image and the image distortion in accordance with the generated horizontal/vertical direction information and the generated image distortion information.

10. The information processing apparatus according to claim 8,
wherein the control circuitry is configured to cause the display to scroll and display the partial image corrected along a horizontal direction of the wide-angle panorama image.

11. The information processing apparatus according to claim 8,
wherein the thumbnail image that the control circuitry causes the display to display has an aspect ratio of 3:4 or an aspect ratio of 9:16.

12. The information processing apparatus according to claim 9, wherein the control circuitry is configured to:
determine a characteristic point set in advance from the wide-angle panorama image;
generate characteristic point possessing partial image information indicating an image portion in which the characteristic point extracted from the wide-angle panorama image is possessed; and
causes the display to scroll and display a plurality of partial images having the characteristic point in accordance with the generated characteristic point possessing partial image information.

13. The information processing apparatus according to claim 8, further comprising:
an input operation interface configured to input operation information,
wherein the input operation interface inputs operation information by each of a first input operation and a second input operation,
wherein the first input operation is an input operation for selecting and specifying an arbitrary partial image thus scrolled and displayed,
wherein the second input operation is an input operation for enlarging and displaying the partial image selected by the first input operation, and
wherein the control circuitry is configured to enlarge an image of a photographic subject near a point specified by the input operation interface when the operation information by the second input operation is inputted from the input operation interface and cause the display to display the enlarged image.

14. The information processing apparatus according to claim 8, further comprising:
an input operation interface configured to input operation information,
wherein the input operation interface inputs operation information by each of a first input operation and a another input operation,
wherein the first input operation is an input operation for selecting and specifying an arbitrary partial image thus scrolled and displayed,
wherein the another input operation is an input operation for enlarging and displaying the partial image selected by the first input operation, and
wherein the control circuitry is configured to enlarge an image of a photographic subject by using a point specified by the input operation interface as a center when the operation information by the another input operation is inputted from the input operation interface and cause the display to display the enlarged image.

\* \* \* \* \*